(12) United States Patent
Kim et al.

(10) Patent No.: US 11,864,264 B2
(45) Date of Patent: Jan. 2, 2024

(54) METHOD FOR ACCESSING ANOTHER PLMN TO DEAL WITH NETWORK FAILURE

(71) Applicant: LG ELECTRONICS INC., Seoul (KR)

(72) Inventors: Hyunsook Kim, Seoul (KR); Laeyoung Kim, Seoul (KR); Sangmin Park, Seoul (KR); Myungjune Youn, Seoul (KR); Sungduck Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 159 days.

(21) Appl. No.: 17/600,505

(22) PCT Filed: Sep. 25, 2019

(86) PCT No.: PCT/KR2019/012436
§ 371 (c)(1),
(2) Date: Sep. 30, 2021

(87) PCT Pub. No.: WO2020/204282
PCT Pub. Date: Oct. 8, 2020

(65) Prior Publication Data
US 2022/0217522 A1    Jul. 7, 2022

(30) Foreign Application Priority Data

Apr. 2, 2019  (KR) .................. 10-2019-0038705

(51) Int. Cl.
*H04W 8/02* (2009.01)
*G06F 3/04817* (2022.01)
*H04W 84/04* (2009.01)

(52) U.S. Cl.
CPC ........... *H04W 8/02* (2013.01); *G06F 3/04817* (2013.01); *H04W 84/042* (2013.01)

(58) Field of Classification Search
CPC ........... H04W 8/02; H04W 8/04; H04W 8/08; H04W 8/18; H04W 84/042; H04W 28/24; G06F 3/04817
See application file for complete search history.

(56) References Cited

U.S. PATENT DOCUMENTS 9,713,080 B1 * 7/2017 Lee ..................... H04W 48/18
2014/0269525 A1   9/2014 Li et al.
(Continued)

OTHER PUBLICATIONS

LG Electronics, Clarification on PLMN selection for non public network, S1-190017, 3GPP TSG-SA WG1 Meeting #85, Tallinn, Estonia, Feb. 2, 2019, see pp. 3,5.
(Continued)

*Primary Examiner* — Wayne H Cai
(74) *Attorney, Agent, or Firm* — BRYAN CAVE LEIGHTON PAISNER LLP

(57) ABSTRACT

A disclosure of the present specification provides a method for accessing another Public Land Mobile Network (PLMN) instead of a subscribed third PLMN. According to the method, a terminal may access a second PLMN, which provides a service, instead of a first PLMN that is roaming-agreed with the third PLMN. In addition, according to the method, the terminal may display, on a screen, information indicating that access is made to the second PLMN. The second PLMN may provide only a limited service.

20 Claims, 29 Drawing Sheets

(56) References Cited

U.S. PATENT DOCUMENTS

| | | |
|---|---|---|
| 2015/0094058 A1 | 4/2015 | Dang et al. |
| 2015/0365818 A1* | 12/2015 | Mese ................ H04M 3/42382 |
| | | 370/252 |
| 2016/0135006 A1* | 5/2016 | Fjeldsoe-Nielsen ......................... |
| | | H04B 1/3827 |
| | | 455/456.3 |
| 2018/0092016 A1 | 3/2018 | Kim et al. |
| 2019/0053139 A1* | 2/2019 | Basu Mallick ....... H04W 76/10 |

OTHER PUBLICATIONS

Nokia et al., Support of restricted local operator services for UEs in limited service state, C1-191267, 3GPP TSG CT WG1, Meeting #115, Montreal, Canada, Mar. 1, 2019, see pp. 1-8.

* cited by examiner

METHOD FOR ACCESSING ANOTHER PLMN TO DEAL WITH NETWORK FAILURE

This application is the National Stage filing under 35 U.S.C. 371 of International Application No. PCT/KR2019/012436 filed on Sep. 25, 2019, which claims priority to Korean Patent Application No. 10-2019-0038705 filed on Apr. 2, 2019, the contents of which are all hereby incorporated by reference herein in their entirety.

TECHNICAL FIELD

The present specification relates to mobile communication.

BACKGROUND

System Architecture Evolution (SAE) that has been performed based on 3rd Generation Partnership Project (3GPP) Service and System Aspects (SA) Working Group 2 (WG2) is research regarding network technology that aims to determine the structure of a network and to support mobility between heterogeneous networks in line with an LTE task of a 3GPP Technical Specification Group (TSG) Radio Access Network (RAN) and is one of recent important standardization issues of 3GPP. SAE is a task for developing a 3GPP system into a system that supports various radio access technologies based on an Internet Protocol (IP), and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows a structure of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (Evolved Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM)/Enhanced Data rates for Global Evolution (EDGE) Radio Access Network (GERAN)).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an untrusted network, such as an Interworking Wireless Local Area Network (I-WLAN), a trusted network, such as a Code Division Multiple Access (CDMA)).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference |

TABLE 1-continued

| REFERENCE POINT | DESCRIPTION |
|---|---|
| | point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point that provides related control and mobility support between trusted non-3GPP access and PDN GWs to the user plane. S2b is a reference point that provides related control and mobility support between ePDG and P-GW to the user plane.

FIG. 2 is an exemplary diagram showing the general functions of the main nodes of the E-UTRAN and the EPC.

As shown, the eNodeB 20 may perform functions for routing to a gateway while the RRC connection is active, scheduling and transmission of paging messages, scheduling and transmission of a Broadcast Channel (BCH), dynamic allocation of resources in uplink and downlink to the UE, configuration and provision for measurement of the eNodeB 20, radio bearer control, radio admission control, and connection mobility control, etc. Within the EPC, the eNodeB 20 may perform paging generation, LTE_IDLE state management, user plane encryption, EPS bearer control, encryption and integrity protection of NAS signaling.

FIG. 3 is an exemplary diagram showing the structure of a radio interface protocol in the control plane between the UE and the eNodeB. FIG. 4 is another exemplary diagram showing the structure of a radio interface protocol in the user plane between the UE and the eNB.

The radio interface protocol is based on the 3GPP radio access network standard. The radio interface protocol horizontally consists of a physical layer, a data link layer, and a network layer. The radio interface protocol is vertically divided into a user plane for transmitting data information and a control plane for transmitting a control signal.

The protocol layers may be divided into L1 (Layer 1), L2 (Layer 2), and L3 (Layer 3) based on the lower three layers of the Open System Interconnection (OSI) standard model widely known in communication systems.

Hereinafter, each layer of the radio protocol in the control plane shown in FIG. 3 and the radio protocol in the user plane shown in FIG. 4 will be described.

The first layer, the physical layer, provides an information transfer service using a physical channel. The physical layer is connected to an upper Medium Access Control (MAC) layer through a transport channel, and data between the MAC layer and the physical layer is transmitted through the transport channel And, data is transferred between different physical layers, that is, between the physical layers of the transmitting side and the receiving side through a physical channel.

A physical channel consists of several subframes on the time axis and several sub-carriers on the frequency axis. Here, one sub-frame is composed of a plurality of symbols on the time axis and a plurality of sub-carriers. One sub-frame is composed of a plurality of resource blocks, and one resource block is composed of a plurality of symbols and a plurality of subcarriers. A Transmission Time Interval (TTI), which is a unit time for data transmission, is 1 ms corresponding to one subframe.

According to 3GPP LTE, the physical channels existing in the physical layers of the transmitting side and the receiving side may be divided into a data channel, i.e., Physical Downlink Shared Channel (PDSCH) and a Physical Uplink Shared Channel (PUSCH), and a control channel, i.e., a Physical Downlink Control Channel (PDCCH), a Physical Control Format Indicator Channel (PCFICH), a Physical Hybrid-ARQ Indicator Channel (PHICH), and a Physical Uplink Control Channel (PUCCH).

The PCFICH transmitted in the first OFDM symbol of the subframe carries a Control Format Indicator (CFI) regarding the number of OFDM symbols used for transmission of control channels in the subframe (i.e., the size of the control region). The wireless device first receives the CFI on the PCFICH and then monitors the PDCCH.

Unlike the PDCCH, the PCFICH does not use blind decoding and is transmitted through a fixed PCFICH resource of a subframe.

The PHICH carries a Positive-Acknowledgement (ACK)/Negative-Acknowledgement (NACK) signal for a UL Hybrid Automatic Repeat Request (HARQ). An ACK/NACK signal for uplink (UL) data on a PUSCH transmitted by a wireless device is transmitted on a PHICH.

A Physical Broadcast Channel (PBCH) is transmitted in the first four OFDM symbols of the second slot of the first subframe of the radio frame. The PBCH carries system information essential for a wireless device to communicate with a base station, and the system information transmitted through the PBCH is called a Master Information Block (MIB). In comparison, the system information transmitted on the PDSCH indicated by the PDCCH is referred to as a System Information Block (SIB).

PDCCH may carry resource allocation and transmission format of a Downlink Shared Channel (DL-SCH), resource allocation information of an Uplink Shared Channel (UL-SCH), paging information on the PCH, system information on the DL-SCH, resource allocation of a higher layer control message such as a random access response transmitted on the PDSCH, a set of transmission power control commands for individual UEs in an arbitrary UE group, and activation of Voice over Internet Protocol (VoIP). A plurality of PDCCHs may be transmitted in the control region, and the UE may monitor the plurality of PDCCHs. The PDCCH is transmitted on an aggregation of one or several consecutive Control Channel Elements (CCEs). The CCE is a logical allocation unit used to provide the PDCCH with a coding rate according to the state of a radio channel. The CCE corresponds to a plurality of resource element groups. The format of the PDCCH and the possible number of bits of the PDCCH are determined according to the correlation between the number of CCEs and the coding rates provided by the CCEs.

Control information transmitted through the PDCCH is referred to as Downlink Control Information (DCI). DCI may include PDSCH resource allocation (this may also be called a DL grant), PUSCH resource allocation (this may also be called an UL grant), a set of transmit power control commands for individual UEs in an arbitrary UE group and/or activation of Voice over Internet Protocol (VoIP).

In the second layer, there are several layers. First, the MAC layer plays a role in mapping various logical channels to various transport channels, and plays a role in logical channel multiplexing that maps multiple logical channels to one transport channel. The MAC layer is connected to the Radio Link Control (RLC) layer, which is the upper layer, by a logical channel Logical channels are largely divided into a control channel for transmitting control plane information and a traffic channel for transmitting user plane information according to the type of information to be transmitted.

The RLC layer of the second layer plays a role in diving and concatenating the data received from the upper layer to adjust the data size so that the lower layer is suitable for data transmission in the radio section. In addition, in order to ensure the various Quality of Service (QoS) required by each Radio Bearer (RB), three operation modes, i.e., Transparent Mode (TM), Un-acknowledged Mode (UM, no response mode), and Acknowledged Mode (AM, response mode), are provided. In particular, AM RLC performs a retransmission function through an Automatic Repeat and Request (ARQ) function for reliable data transmission.

The Packet Data Convergence Protocol (PDCP) layer of the second layer plays a role in header compression to reduce the size of the IP packet header which is relatively large and contains unnecessary control information in order to efficiently transmit IP packets such as IPv4 or IPv6 in a radio section with a small bandwidth. This serves to increase the transmission efficiency of the radio section by transmitting only necessary information in the header part of the data. In addition, in the LTE system, the PDCP layer also performs a security function, which consists of ciphering to prevent data interception by a third party and integrity protection to prevent data manipulation by a third party.

The Radio Resource Control (RRC) layer located at the top of the third layer is defined only in the control plane, and are responsible for the control of logical channels, transport channels and physical channels related to the configuration, reconfiguration, and release of the RB. In this case, the RB means a service provided by the second layer for data transfer between the UE and the E-UTRAN.

If there is an RRC connection between the RRC of the UE and the RRC layer of the wireless network, the UE is in the RRC connected mode, otherwise it is in the RRC idle mode.

Hereinafter, an RRC state of the UE and an RRC connection method will be described. The RRC state refers to whether or not the RRC of the UE is logically connected to the RRC of the E-UTRAN. If it is connected, it is called an RRC_CONNECTED state, and if it is not connected, it is called an RRC_IDLE state. Since the UE in the RRC_CONNECTED state has an RRC connection, the E-UTRAN can determine the existence of the UE on per cell, and thus can effectively control the UE. On the other hand, the E-UTRAN cannot detect the existence of the UE in the RRC_IDLE state, and the core network manages the UE per Tracking Area (TA), which is larger regional unit than the cell. That is, the UE in the RRC_IDLE state is only checked whether the UE exists in a larger area than the cell, and in order to receive a normal mobile communication service such as voice or data, the UE should transit to the RRC_CONNECTED state. Each TA is identified through a Tracking Area Identity (TAI). The UE may configure the TAI through a Tracking Area Code (TAC), which is information broadcast in a cell.

When the user turns on the UE for the first time, the UE first searches for an appropriate cell, then establishes an RRC connection in the corresponding cell, and registers information on the UE in the core network. After this, the UE stays in the RRC_IDLE state. The UE staying in the RRC_IDLE state (re)selects a cell as needed, and looks at system information or paging information. This is called camping on the cell. The UE, which stayed in the RRC_IDLE state, establishes an RRC connection with the RRC of the E-UTRAN through an RRC connection procedure and then transits to the RRC_CONNECTED state only when it is necessary to establish an RRC connection. There are several cases in which the UE in the RRC_IDLE state needs to establish an RRC connection, e.g., when uplink data transmission is required for reasons such as a user's call attempt, or when a paging message is received from E-UTRAN, for transmission of a response message to the paging message.

The Non-Access Stratum (NAS) layer located above the RRC layer performs functions such as session management and mobility management.

Hereinafter, the NAS layer shown in FIG. 3 will be described in detail.

Evolved Session Management (ESM) belonging to the NAS layer performs functions such as default bearer management and dedicated bearer management, and is responsible for controlling the UE to use the Packet Switched (PS) service from the network. The default bearer resource has the characteristic that it is allocated from the network when it is connected to a specific PDN for the first time. At this time, the network allocates an IP address usable by the UE so that the UE can use the data service, and also allocates QoS of the default bearer. LTE supports two types: a bearer with a Guaranteed Bit Rate (GBR) QoS characteristic that guarantees a specific bandwidth for data transmission and reception, and a non-GBR-bearer with a best effort QoS characteristic without a bandwidth guarantee. do. In the case of a default bearer, a non-GBR-bearer is allocated. In the case of a dedicated bearer, a bearer having QoS characteristics of GBR or non-GBR may be allocated.

The bearer allocated to the UE by the network is called an EPS bearer, and when the EPS bearer is allocated, the network allocates one ID. This is called the EPS bearer ID. One EPS bearer has QoS characteristics of Maximum Bit Rate (MBR) and Guaranteed Bit Rate (GBR) or Aggregated Maximum Bit Rate (AMBR).

FIG. 5a is a flowchart illustrating a random access procedure in 3GPP LTE.

The random access procedure is used for the UE 10 to obtain UL synchronization with the base station, i.e., the eNodeB 20, or to be allocated UL radio resources.

The UE 10 receives a root index and a Physical Random Access Channel (PRACH) configuration index from the eNodeB 20. There are 64 candidate random access preambles defined by a Zadoff-Chu (ZC) sequence for each cell, and the root index is a logical index for the UE to generate 64 candidate random access preambles.

Transmission of the random access preamble is limited to specific time and frequency resources for each cell. The PRACH configuration index indicates a specific subframe and preamble format in which the random access preamble can be transmitted.

The UE 10 transmits a randomly selected random access preamble to the eNodeB 20. The UE 10 selects one of 64 candidate random access preambles. Then, the UE 10 selects a corresponding subframe according to the PRACH configuration index. The UE 10 transmits the selected random access preamble in the selected subframe.

Upon receiving the random access preamble, the eNodeB 20 transmits a Random Access Response (RAR) to the UE 10. The random access response is detected in two steps. First, the UE 10 detects a PDCCH masked with a Random Access Radio Network Temporary Identity (RA-RNTI). The UE 10 receives a random access response in a MAC Protocol Data Unit (PDU) on the PDSCH indicated by the detected PDCCH.

FIG. 5b shows a connection process in an RRC layer.

As shown in FIG. 5b, the RRC state is indicated depending on whether RRC is connected or not. The RRC state means whether or not the entity of the RRC layer of the UE 10 is in logical connection with the entity of the RRC layer of the eNodeB 20. A state that is connected is called an RRC connected state, and a state that is not connected is called an RRC idle state.

Since the UE 10 in the connected state has an RRC connection, the E-UTRAN can determine the existence of the corresponding UE on per cell, and thus can effectively control the UE 10. On the other hand, the UE 10 in the idle state cannot be detected by the eNodeB 20, and is managed by the core network in a tracking area unit, which is a larger area unit than the cell. The tracking area is an aggregate unit of cells. That is, only the existence of the UE 10 in the idle state is determined in a large area unit, and in order to receive a normal mobile communication service such as voice or data, the UE should transit to the connected state.

When the user turns on the UE 10 for the first time, the UE 10 first searches for an appropriate cell and then stays in an idle state in the corresponding cell. The UE 10, which stayed in the idle state, establishes an RRC connection with the RRC layer of the eNodeB 20 through an RRC connection procedure and transits to an RRC connected state only when it needs to establish an RRC connection.

There are several cases in which the UE in the idle state needs to establish an RRC connection, e.g., a user's call attempt or when uplink data transmission is required, or when a paging message is received from the E-UTRAN, for transmission of the response message.

In order for the UE 10 in the idle state to establish an RRC connection with the eNodeB 20, an RRC connection procedure should be performed as mentioned above. The RRC connection process includes, largely, a process in which the UE 10 transmits an RRC connection request message to the eNodeB 20, a process in which the eNodeB 20 transmits an RRC connection setup message to the UE 10, and a process in which the UE 10 transmits an RRC connection setup complete message to the eNodeB 20. This process will be described in more detail with reference to FIG. 5b as follows.

When the UE 10 in the idle state wants to establish an RRC connection for reasons such as a call attempt, a data transmission attempt, or a response to a paging of the eNodeB 20, first, the UE 10 transmits a RRC connection request message to the eNodeB 20.

Upon receiving the RRC connection request message from the UE 10, the eNB 20 accepts the RRC connection request of the UE 10 if the radio resources are sufficient, and transmits a RRC connection setup message as a response message to the UE 10.

Upon receiving the RRC connection setup message, the UE 10 transmits an RRC connection setup complete message to the eNodeB 20. When the UE 10 successfully transmits the RRC connection establishment message, the UE 10 establishes an RRC connection with the eNodeB 20 and transits to the RRC connected mode.

<Network Failure>

Meanwhile, a failure may occur in the base station of the first Public Land Mobile Network (PLMN) by the first operator, and a situation may occur in which a mobile communication service cannot be provided any longer through the corresponding base station.

A simple failure can be restored within a short period of time, but when a failure occurs due to fire, flooding, etc., it may not be restored for hours or days. In this case, simple communication may cause inconvenience to the user, but interruption of important communication (e.g., emergency call (119 or 911 call) or corporate Virtual Private Network (VPN) communication) may cause a major problem.

Therefore, when a failure occurs in the first PLMN by the first operator, another second operator should be able to provide services for subscribers of the first operator on behalf of the first operator.

However, there is a problem that a technical method for this has not been proposed so far.

SUMMARY

Accordingly, an object of the present specification is to propose a method for solving the above-described problems.

In order to achieve the above object, a disclosure of the present specification provides a method of accessing another Public Land Mobile Network (PLMN) instead of a subscribed third PLMN. According to the method, a User Equipment (UE) may access a second PLMN providing a service on behalf of a first PLMN which has a roaming agreement with the third PLMN. And according to the method, the UE may display information indicating access to the second PLMN on a screen. The second PLMN may provide only a limited service.

In order to achieve the above object, a disclosure of the present specification may provide a User Equipment (UE) accessing another Public Land Mobile Network (PLMN) instead of a subscribed third PLMN. The UE may include a transceiver configured to access a second PLMN providing a service on behalf of a first PLMN which has a roaming agreement with the third PLMN. The UE may include a display unit configured to display information indicating access to the second PLMN on a screen of the UE. The second PLMN may provide only a limited service.

According to the disclosure of the present specification, it is possible to solve the problems of the prior art.

DETAILED DESCRIPTION

Figure 1:
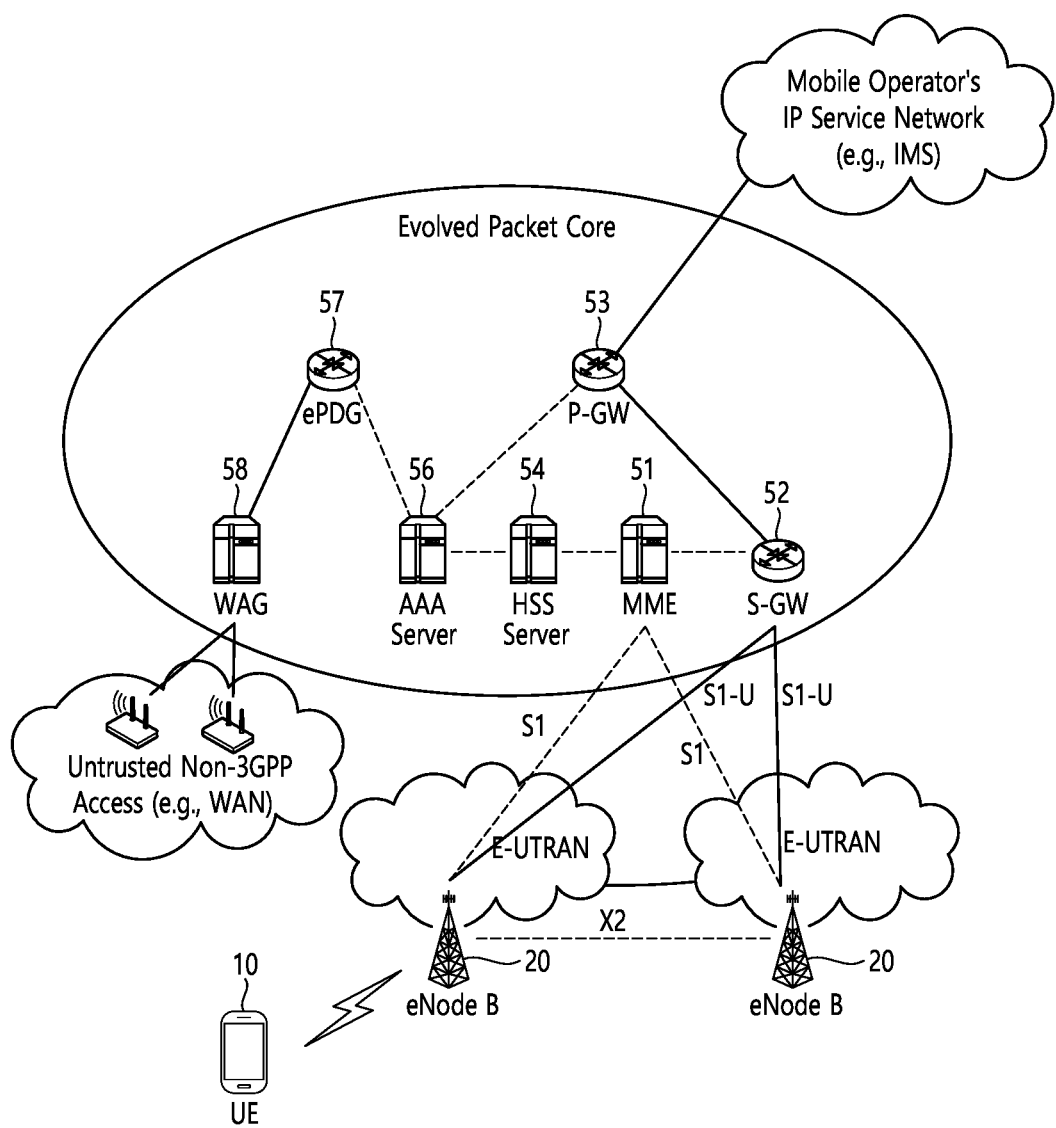
FIG. 1 shows a structure of an evolved mobile communication network.
Figure 2:
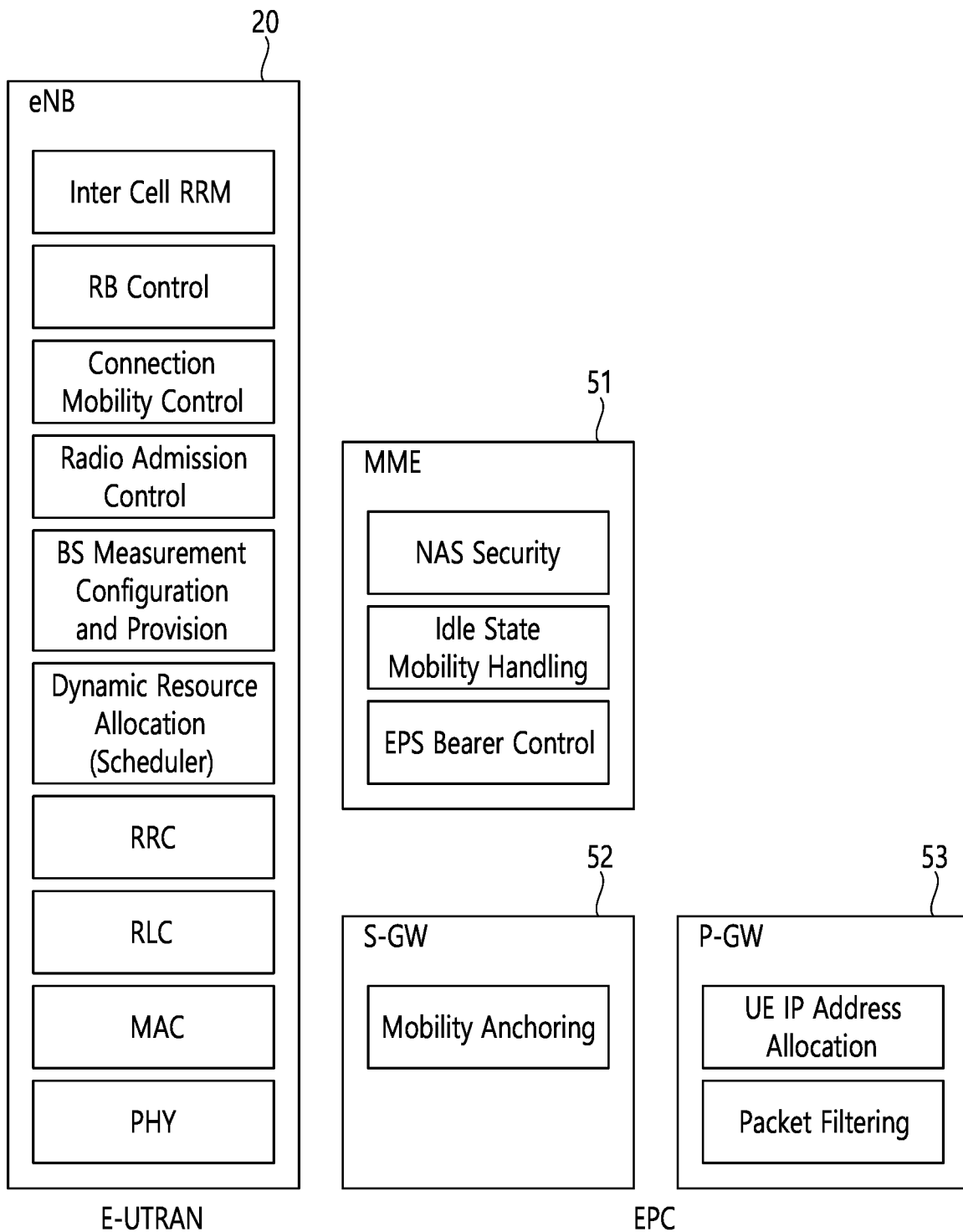
FIG. 2 is an exemplary diagram showing the general functions of the main nodes of the E-UTRAN and the EPC.
Figure 3:
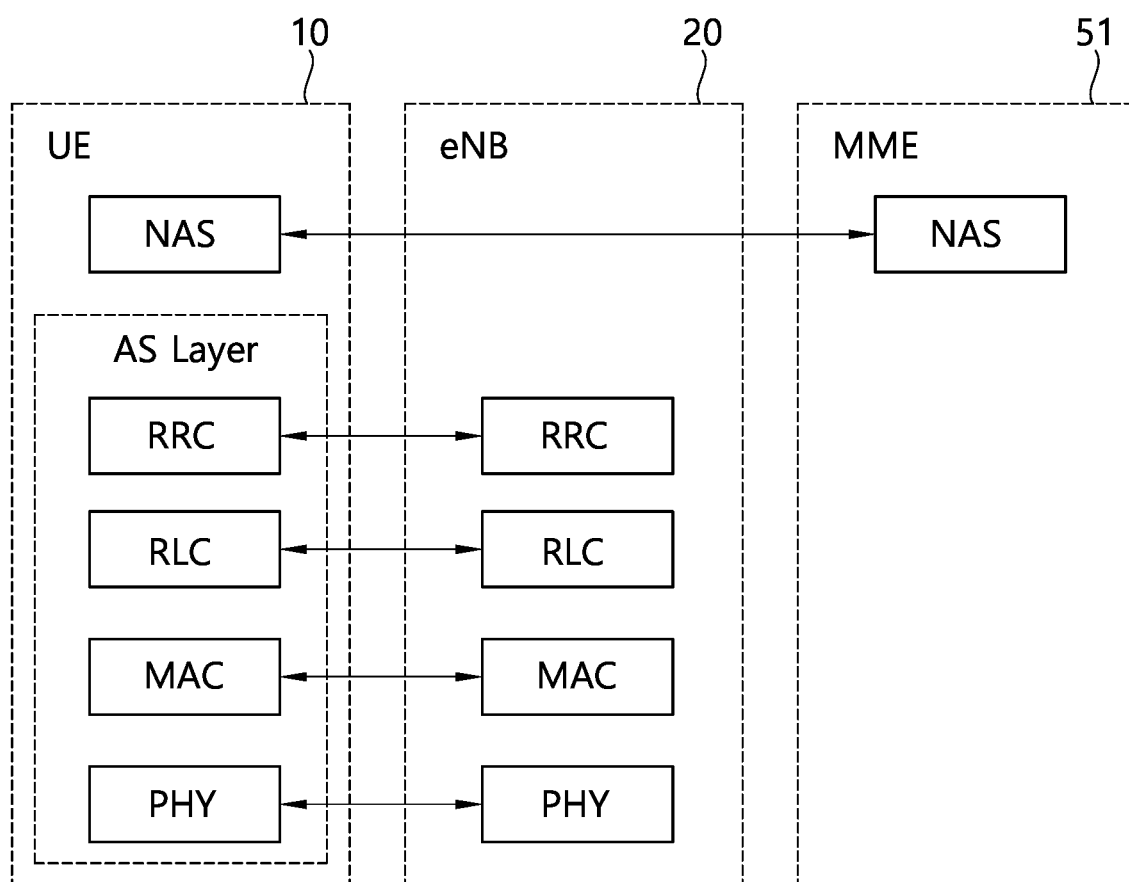
FIG. 3 is an exemplary diagram showing the structure of a radio interface protocol in the control plane between the UE and the eNodeB.
Figure 4:
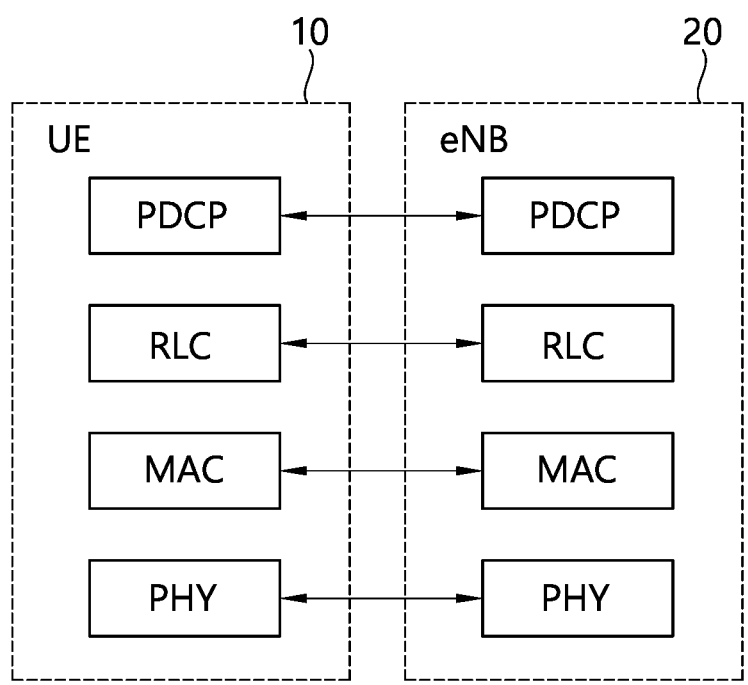
FIG. 4 is another exemplary diagram showing the structure of a radio interface protocol in the user plane between the UE and the eNB.
Figure 5A:
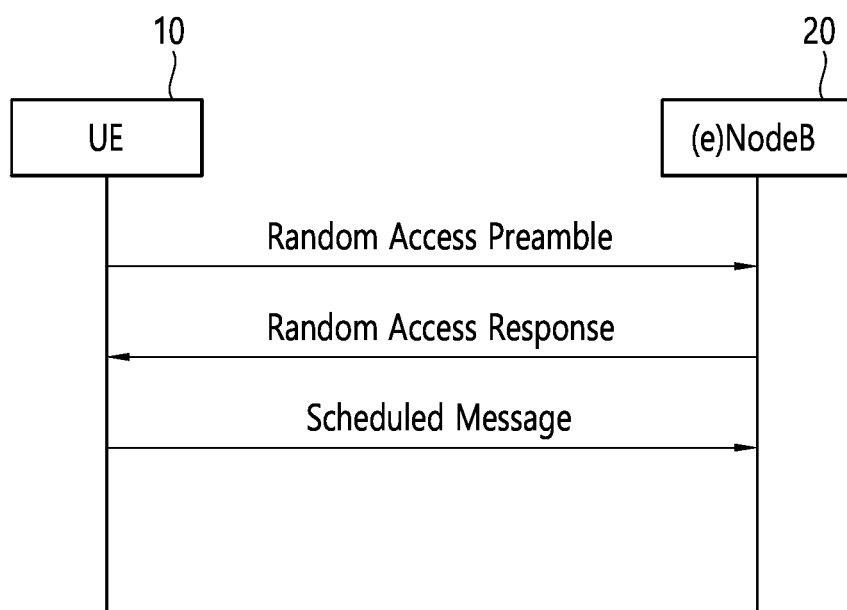
FIG. 5a is a flowchart illustrating a random access procedure in 3GPP LTE.
Figure 5B:
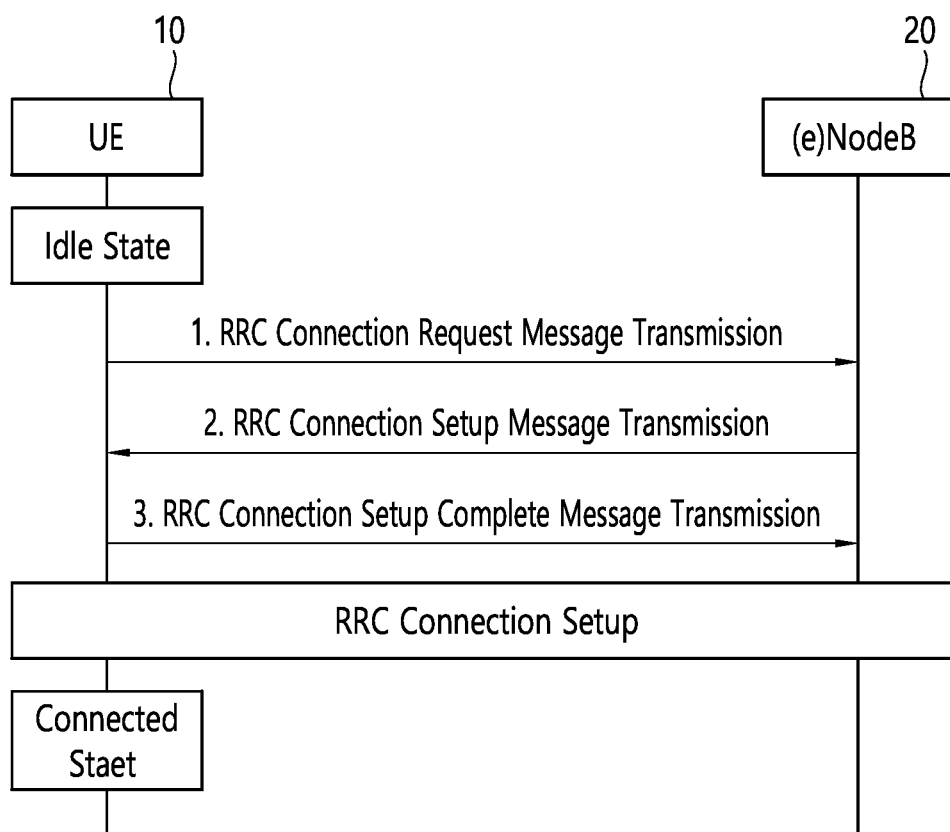
FIG. 5b shows a connection process in an RRC layer.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term "include" or "have" may represent the existence of a feature, a number, a step, an operation, a component, a part or the combination thereof described in the specification, and may not exclude the existence or addition of another feature, another number, another step, another operation, another component, another part or the combination thereof.

The terms "first" and "second" are used for the purpose of explanation about various components, and the components are not limited to the terms "first" and "second". The terms "first" and "second" are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

In the drawings, User Equipments (UEs) are shown for example. The UE may also be denoted a terminal or Mobile Equipment (ME), etc. The UE may be a portable device such as a laptop computer, a mobile phone, a PDA, a smartphone, a multimedia device, etc., or may be a stationary device such as a PC or a car mounted device.

Definition of Terms

For a better understanding, the terms used herein are briefly defined before going to the detailed description of the disclosure with reference to the accompanying drawings.

GERAN: An abbreviation of GSM EDGE Radio Access Network, which refers to a radio access section connecting the core network of GSM/EDGE and the UE.

UTRAN: Abbreviation for Universal Terrestrial Radio Access Network, which refers to a radio access section connecting the core network of 3G mobile communication and the UE.

E-UTRAN: An abbreviation of Evolved Universal Terrestrial Radio Access Network, which refers to a radio access section connecting the core network of the 4th generation mobile communication, i.e., LTE, and the UE.

UMTS: Abbreviation for Universal Mobile Telecommunication System, which refers to the core network of 3G mobile communication.

UE/MS: An abbreviation of User Equipment/Mobile Station, which refers to a terminal device.

EPS: An abbreviation of an Evolved Packet System, which refers to a core network supporting a Long Term Evolution (LTE) network and to a network evolved from an UMTS.

PDN: An abbreviation of a Public Data Network, which refers to an independent network where a server for providing service is placed.

PDN connection: A connection from UE to a PDN, i.e., an association (or connection) between UE represented by an IP address and a PDN represented by an APN.

PDN-GW (Packet Data Network Gateway): A network node of an EPS network which performs functions of UE IP address allocation, packet screening & filtering, and charging data collection.

S-GW (Serving Gateway): A network node of an EPS network which performs functions of mobility anchor, packet routing, idle mode packet buffering, and triggering an MME to page UE.

PCRF (Policy and Charging Rule Function): A node of an EPS network which performs policy decision to dynamically apply QoS and charging policies differentiated for each service flow APN (Access Point Name): A name of an access point that is managed in a network and provided to UE. That is, an APN is a character string that denotes or identifies a PDN. While requested service or a network (PDN) is accessed via P-GW, an APN is a name (a character string) previously defined within a network to search the so that the corresponding P-GW can be searched for (e.g., 'internet.mnc012.mcc345.gprs').

TEID (Tunnel Endpoint Identifier): End point ID of the tunnel established between nodes in the network, and configured for each section per bearer of each UE.

NodeB: A base station of an UMTS network and is installed outdoors, of which cell coverage corresponds to a macro cell.

eNodeB: A base station of an Evolved Packet System (EPS) and is installed outdoors, of which cell coverage corresponds to a macro cell.

(e)NodeB: A term referring to NodeB and eNodeB.

MME: An abbreviation of a Mobility Management Entity, and performs functions of controlling each entity within an EPS in order to provide a session and mobility for UE.

A session: A path for data transmission, and a unit thereof may be a PDN, a bearer, or an IP flow unit. The units may be classified into, as defined in 3GPP, a unit of the entire target network (i.e., an APN or PDN unit), a unit classified based on QoS within the entire target network (i.e., a bearer unit), and a destination IP address unit.

PDN connection: A connection from UE to a PDN, i.e., an association (or connection) between UE represented by an IP address and a PDN represented by an APN. It means a connection between entities (i.e., UE-PDN GW) within a core network so that a session can be formed.

UE context: Information about the situation of UE which is used to manage the UE in a network, i.e., situation information including an UE ID, mobility (e.g., a current location), and the attributes of a session (e.g., QoS and priority, etc.)

NAS (Non-Access-Stratum): A higher stratum of a control plane between a UE and an MME. The NAS supports mobility management, session management, IP address management, etc., between the UE and the network.

RAT: An abbreviation of Radio Access Technology, which means GERAN, UTRAN, E-UTRAN, etc.

Meanwhile, the embodiments presented below may be implemented alone, but may be implemented as a combination of several embodiments.

Figure 6:
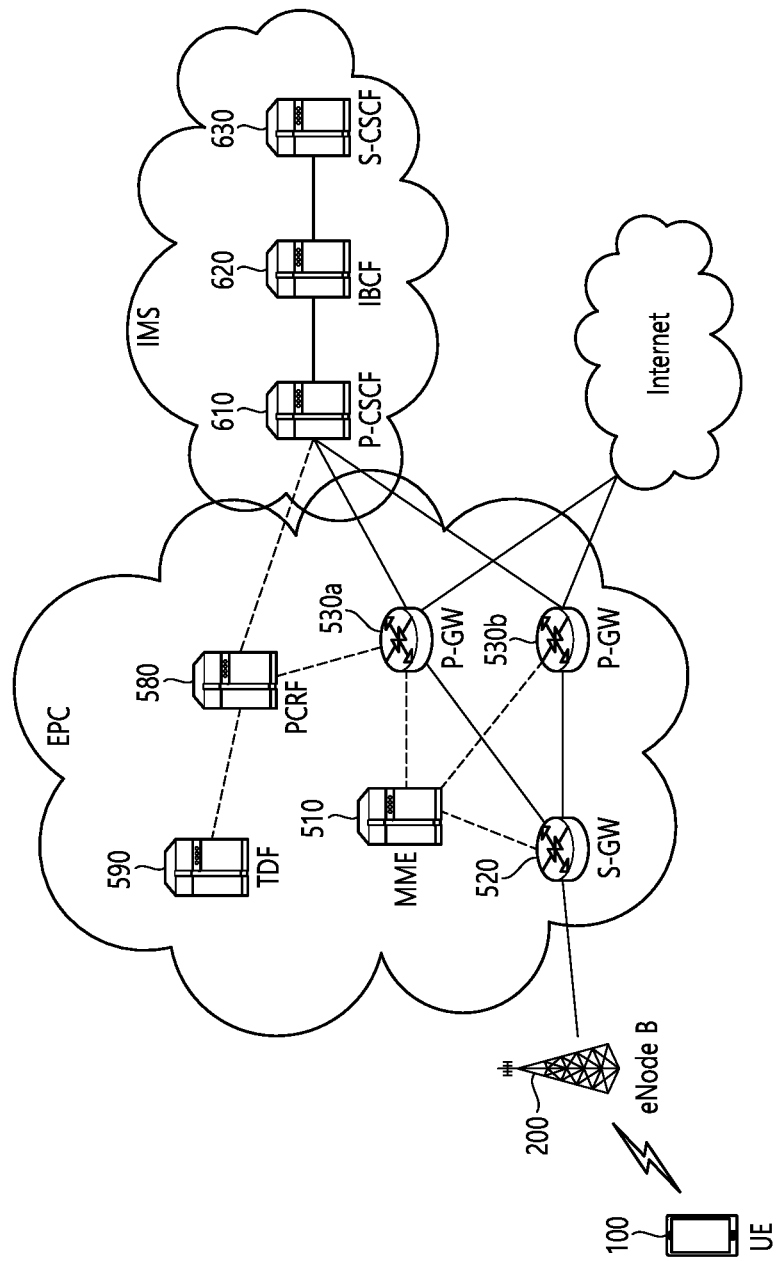
FIG. 6 shows a connection between an EPC and an IP Multimedia Subsystem (IMS).

FIG. 6 shows a connection between an EPC and an IP Multimedia Subsystem (IMS).

Referring to FIG. 6, in the EPC, the MME 510, the S-GW 520, the P-GW 530a connected to the IMS, the P-GW 530b connected to the Internet, the Policy and Charging Rule Function (PCRF) 580 connected to the P-GW 530b, and the Traffic Detection Function (TDF) 590 connected to the PCRF 580 are shown.

The TDF 590 detects the application and reports the detected application and description information about the service data flow of the application to the PCRF 580. The TDF 590 supports solicited application reporting and/or unsolicited application reporting.

IMS is a network technology that enables Packet Switching (PS) based on Internet Protocol (IP) to not only wired terminals but also wireless terminals. It has been proposed to connect both wired terminals and wireless terminal via IP (i.e., All-IP).

The IMS-based network includes Call Session Control Function (CSCF) and Interconnection Border Control Functions (IBCF) 620 for handling procedures for control signaling, registration, and session. The CSCF may include a Proxy-CSCF (P-CSCF) 610 and a Serving-CSCF (S-CSCF) 630. In addition, the CSCF may include an Interrogating-CSCF (I-CSCF). The P-CSCF 610 operates as a first access point for UE in an IMS-based network. Then, the S-CSCF 630 processes a session in the IMS network. That is, the S-SCSF 630 is an entity responsible for routing signaling, and routes a session in the IMS network. And, the I-CSCF operates as an access point with other entities in the IMS network.

Under the above IMS, an IP-based session is controlled by a Session Initiation Protocol (SIP). The SIP is a protocol for controlling a session, and is a signaling protocol that specifies a procedure for UEs wanting to communicate to identify each other and find their location, create a multimedia service session between them, or delete and change the created session. The SIP uses a SIP Uniform Resource Identifier (URI) similar to an e-mail address to distinguish each user, so that a service can be provided without being dependent on an IP address. These SIP messages are control messages, but are transmitted between the UE and the IMS network through the EPC user plane.

Referring to FIG. 6, the first P-GW 530a of the EPC is connected to the P-CSCF 610 of the IMS, the P-CSCF 610 is connected to the IBCF 620, and the IBCF 620 is connected to the S-CSCF 630.

In addition, the second P-GW 530b of the EPC is connected to the network of the Internet service provider.

Figure 7:
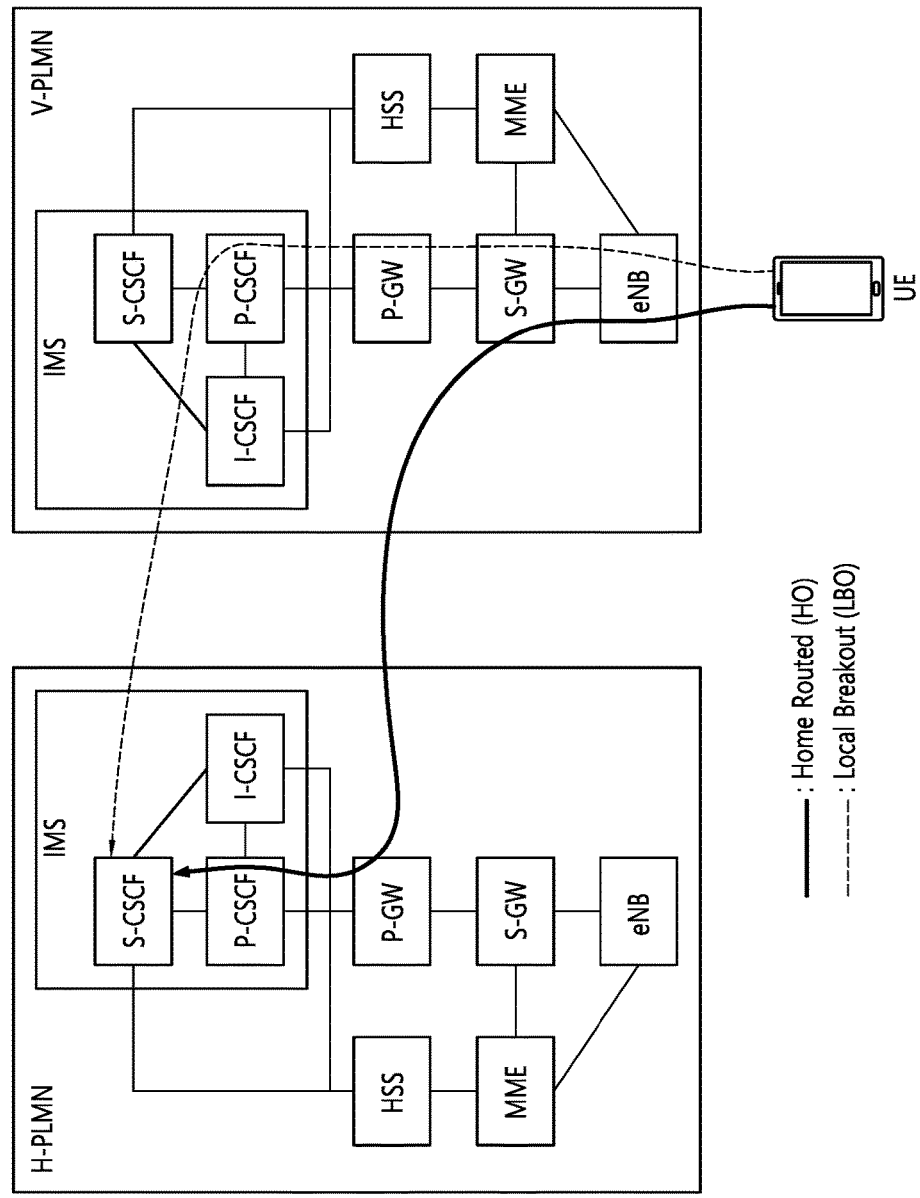
FIG. 7 is an exemplary diagram illustrating a roaming scheme of Voice over LTE (VoLTE).

FIG. 7 is an exemplary diagram illustrating a roaming scheme of Voice over LTE (VoLTE).

As can be seen with reference to FIG. 7, in VoLTE roaming methods, there are a Home Routed (HR) scheme and a Local Breakout (LBO) scheme.

According to the LBO scheme, the IMS signaling transmitted from the UE goes through the S-GW/P-GW/P-CSCF in the Visited Public Land Mobile Network (V-PLMN), and is forwarded to the S-CSCF in the Home PLMN (H-PLMN).

In the HR scheme, the IMS signaling transmitted from the UE goes through the S-GW in the V-PLMN, the P-GW/P-CSCF in the H-PLMN, and then forwarded to the S-CSCF.

Figure 8:
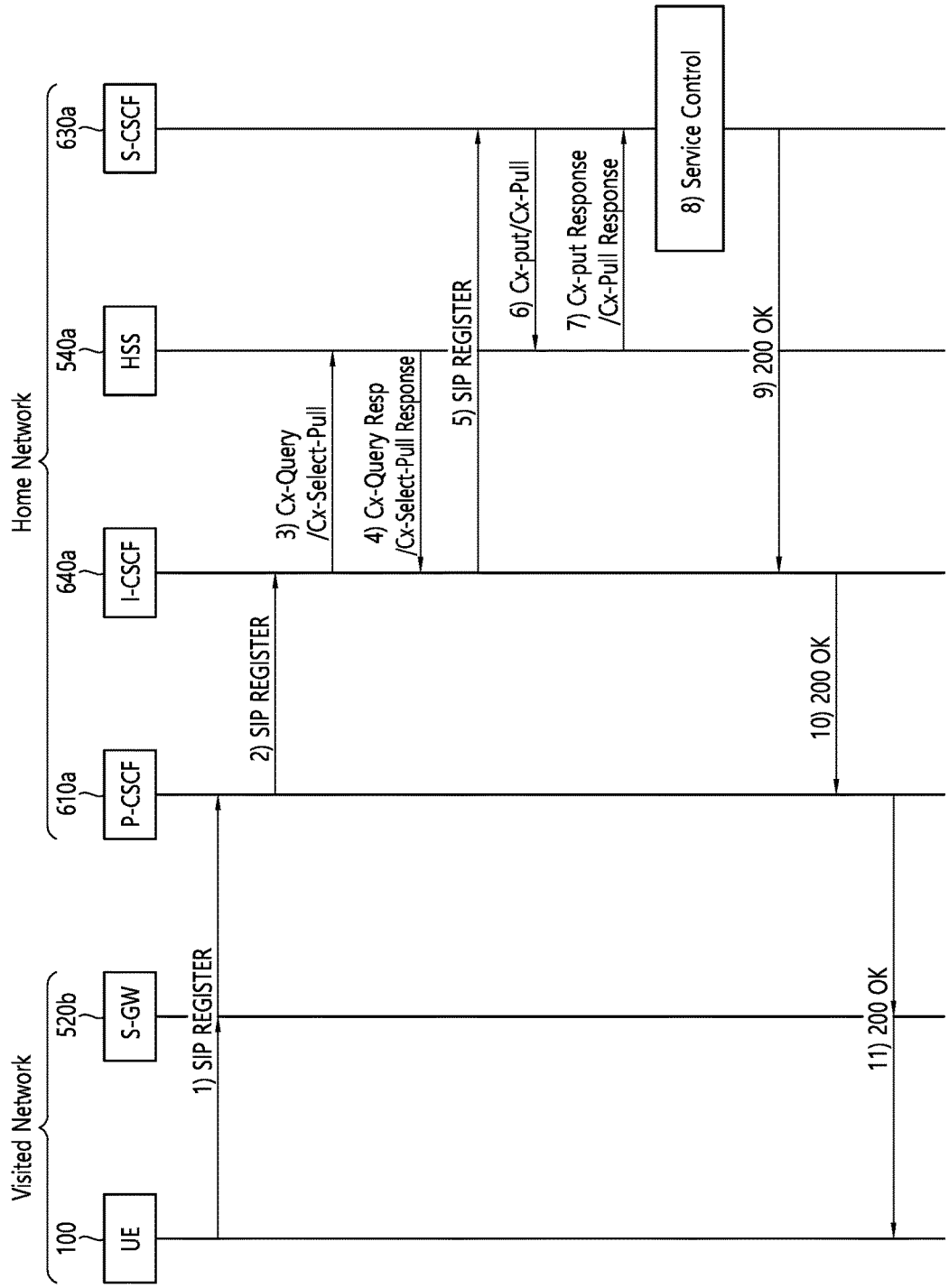
FIG. 8 is an exemplary signal flow diagram illustrating a process of performing IMS registration in a HR scheme in a situation in which the UE roams to a visited network.

FIG. 8 is an exemplary signal flow diagram illustrating a process of performing IMS registration in a HR scheme in a situation in which the UE roams to a visited network.

As can be seen with reference to FIG. 8, the UE 100 is in a roaming state in the visited network.

First, the UE 100 located in the visited network generates an IMS PDN with a P-GW in the home network through the S-GW 520b in the visited network. Here, the IMS PDN may be a PDN for an IMS service, a PDN of a well-known IMS APN, or a PDN for a Voice over LTE service.

1) Next, when the UE 100 transmits a SIP-based REGISTER message to the S-GW 520b in the visited network to perform IMS registration, the S-GW 520b in the visited network forwards the message to the P-CSCF 610a in the home network.
2) The P-CSCF 610a forwards the message to the I-CSCF 640a.
3)~4) The I-CSCF 640a obtains user information from the HSS 540a in the home network.
5) Next, the I-CSCF 640a transmits the SIP-based REGISTER message to the S-CSCF 630a.
6)~7) The S-CSCF 630a obtains user information from the HSS.
8) Subsequently, the S-CSCF 630a performs service control for registration of the UE.
9)~11) If the registration of the UE is successful, the S-CSCF 630a transmits a 200 OK message.

<Structure of Next-Generation Mobile Communication>

With the success of Long Term Evolution (LTE)/LTE-Advanced (LTE-A) for the 4th generation mobile communication, more interest is rising to the next generation, i.e., 5th generation (also known as 5G) mobile communication and extensive research and development are being carried out accordingly.

The 5G mobile communication defined in the International Telecommunication Union (ITU) provides a data transfer rate of up to 20 Gbps and a sensible transfer rate of at least 100 Mbps anytime anywhere. 'IMT-2020' is a formal name, and aims to be commercialized in the year 2020 worldwide.

The ITU proposes three usage scenarios, e.g., enhanced Mobile BroadBand (eMBB), massive Machine Type Communication (mMTC), and Ultra Reliable and Low Latency Communications (URLLC).

First, the URLLC relates to a usage scenario which requires a high reliability and a low latency. For example, a service such as autonomous driving, factory automation, and augmented reality requires a high reliability and a low latency (e.g., a latency less than or equal to 1 ms). At present, a latency of 4G (LTE) is statistically 21-43 ms (best 10%), 33-75 ms (median). This is insufficient to support a service requiring the latency less than or equal to 1 ms.

Next, an eMBB usage scenario relates to a usage scenario requiring a mobile ultra-wide band.

It seems that a core network designed for the existing LTE/LTE-A has difficulty in accommodating a high-speed service of the ultra-wide band.

Therefore, it is urgently required to re-design the core network in 5G mobile communication.

Figure 9:
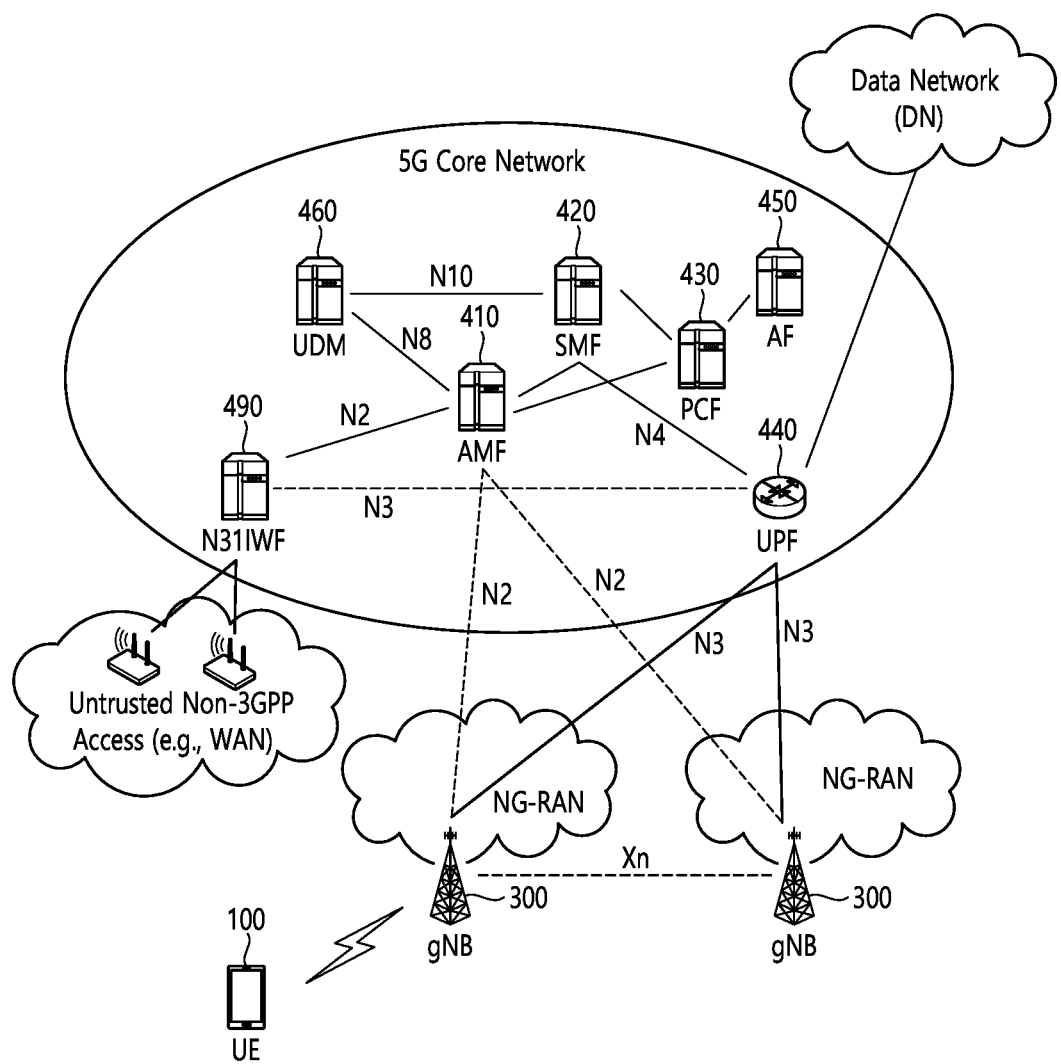
FIG. 9 is a structural diagram of a next-generation mobile communication network.

FIG. 9 is a structural diagram of a next-generation mobile communication network.

5G Core (5GC) may include various components. In FIG. 9, 5GC includes Access and mobility Management Function (AMF) 410, Session Management Function (SMF) 420, Policy Control Function (PCF) 430, User Plane Function (UPF) 440, Application Function (AF) 450, Unified Data Management (UDM) 460, and Non-3GPP InterWorking Function (N3IWF) 490, which correspond to some of them.

The UE 100 is connected to a data network through the UPF 450 through a Next Generation Radio Access Network (NG-RAN).

The UE 100 may be provided with a data service through untrusted non-3GPP access, e.g., Wireless Local Area Network (WLAN). To connect the non-3GPP access to the core network, N3IWF 490 may be deployed.

Figure 10:
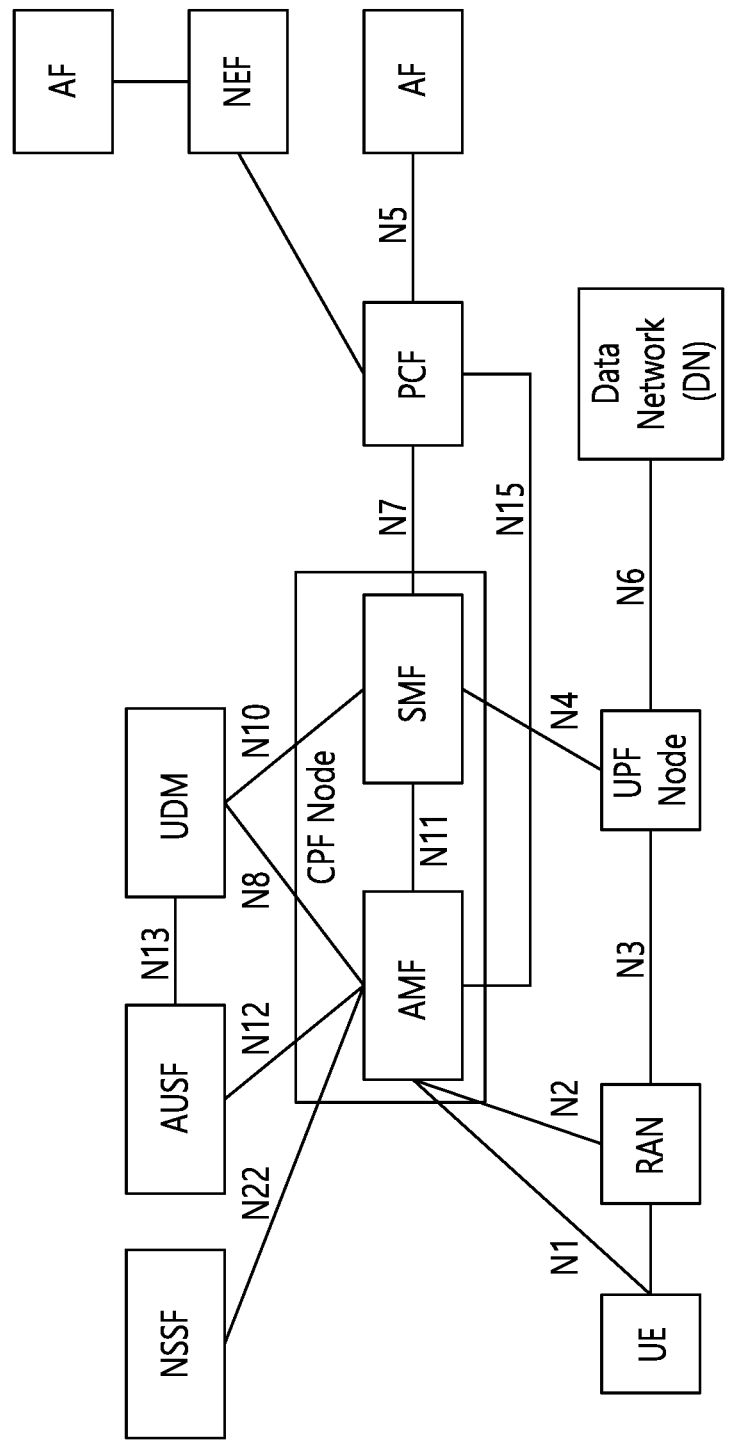
FIG. 10 shows an example of an expected structure of next-generation mobile communication from a node perspective.

FIG. 10 shows an example of an expected structure of next-generation mobile communication from a node perspective.

As can be seen with reference to FIG. 10, a UE is connected to a data network (DN) via a next generation Radio Access Network (RAN).

The illustrated Control Plane Function (CPF) node performs functions of the entirety or part of a Mobility Management Entity (MME) of 4G mobile communication and control plane functions of the entirety or part of a Serving Gateway (S-GW) and PDN gateway (P-GW) of 4G mobile communication. The CPF node includes an Access and mobility Management Function (AMF) and a Session Management Function (SMF).

The illustrated User Plane Function (UPF) node is a type of a gateway through which user data is transmitted/received. The UPF node may perform user plane functions of the entirety or part of an S-GW or P-GW of 4G mobile communication.

The illustrated Policy Control Function (PCF) is a node which controls a provider's policy.

The illustrated Application Function (AF) is a server for providing several services to the UE.

The illustrated Unified Data Management (UDM) is a type of a server which manages subscriber information, like a Home Subscriber Server (HSS) of 4G mobile communication. The UDM stores the subscriber information in a Unified Data Repository (UDR) and manages it.

The illustrated Authentication Server Function (AUSF) authenticates and manages the UE.

The illustrated Network Slice Selection Function (NSSF) is a node for network slicing as described below.

In FIG. 10, the UE can simultaneously access two data networks by using multiple Protocol Data Unit (PDU) sessions.

Figure 11:
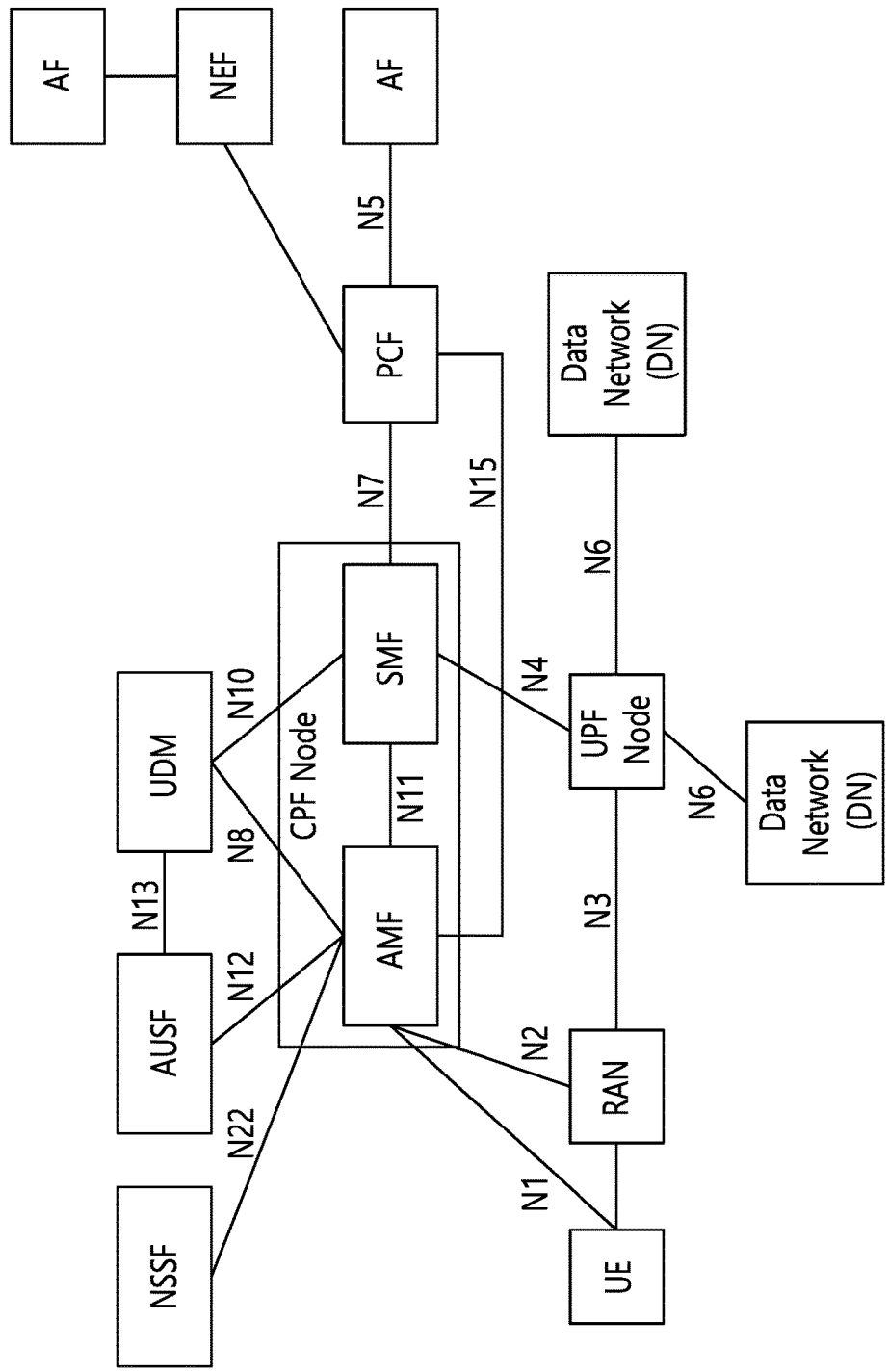
FIG. 11 shows an example of an architecture for supporting simultaneous access to two data networks.

FIG. 11 shows an example of an architecture for supporting simultaneous access to two data networks.

FIG. 11 shows an architecture for a UE to simultaneously access two data networks using one PDU session.

Figure 12:
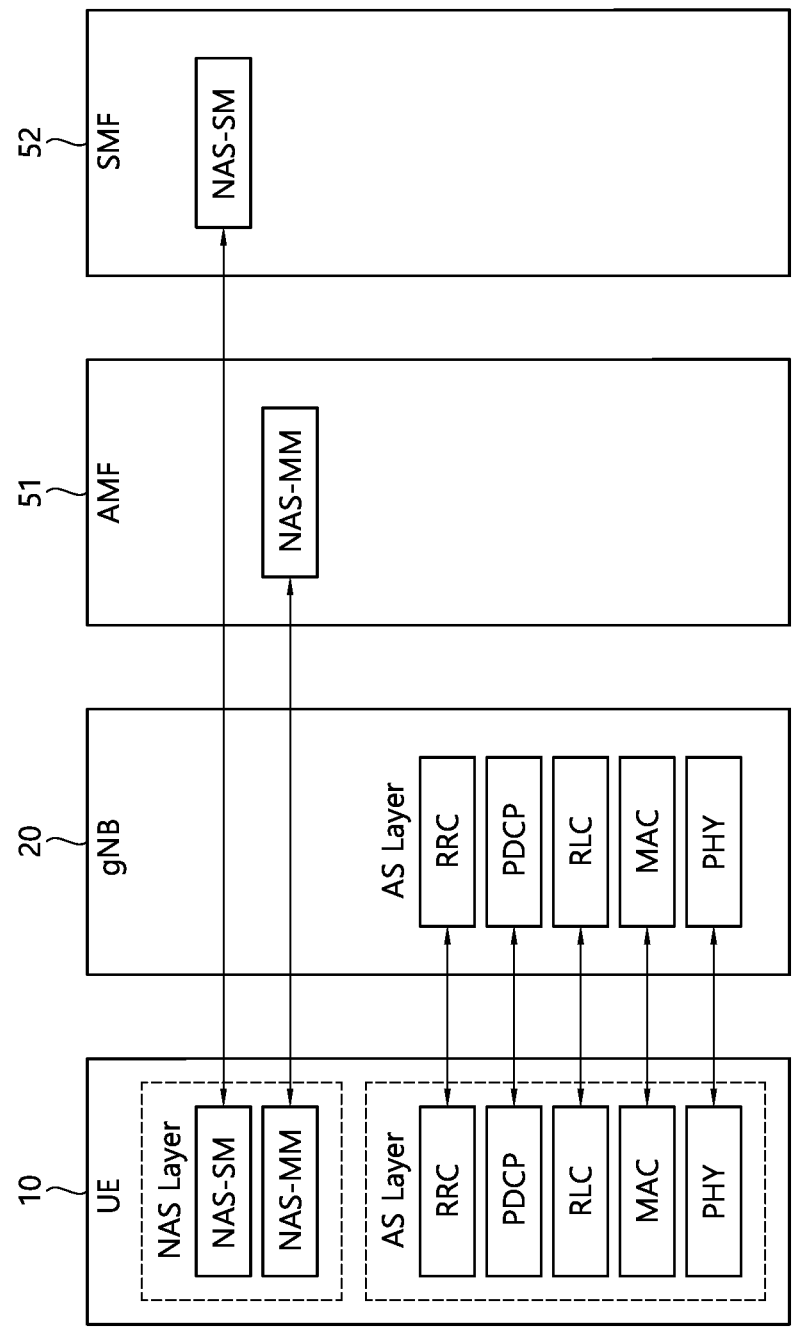
FIG. 12 is another exemplary diagram showing the structure of a radio interface protocol between the UE and the gNB.

FIG. 12 is another exemplary diagram showing the structure of a radio interface protocol between the UE and the gNB.

The radio interface protocol is based on the 3GPP radio access network standard. The radio interface protocol is horizontally composed of a physical layer, a data link layer, and a network layer, and is vertically divided into a user plane for transmitting data information and a control plane for transmitting a control signal.

The protocol layers may be divided into L1 (Layer 1), L2 (Layer 2), and L3 (Layer 3) based on the lower three layers of the Open System Interconnection (OSI) reference model widely known in communication systems.

Meanwhile, in FIG. 12, the RRC layer, the RLC layer, the MAC layer, and the PHY layer located below the NAS layer are collectively referred to as an Access Stratum (AS).

Problems to be Solved by the Disclosure of the Present Specification

The present specification describes a situation in which a failure occurs in the base station of the first PLMN by the first operator so that the mobile communication service can no longer be provided through the corresponding base station. It is assumed that, temporarily (e.g., hours or days, etc.) until the physical recovery of the corresponding base station is made, the base station of the second PLMN by the second operator broadcasts SIB by including information on the first PLMN by a third party (i.e., the first operator) in order to provide services on behalf of the first operator in the affected area.

In this case, the third-party subscription UE receiving the broadcast information accesses the network in the same way as accessing the HPLMN, whereas the network provides a form of servicing a roaming UE. That is, from a network point of view, in order to cope with a failure occurring in the first PLMN of the first operator, the network node of the second PLMN (e.g., VPLMN) of the second operator connects to the network node of the first PLMN (e.g., HPLMN), and thus a route such as roaming of Home Routed (HR) scheme can be used. This may cause the following problems.

It is assumed that the UE subscribed to the third PLMN of the third operator performs roaming to the first PLMN of the first operator. Such UE is referred to as an inbound roaming UE. Meanwhile, suppose that a failure has occurred in the first PLMN of the first operator. In this case, the second PLMN of the second operator transmits a System Information Block (SIB) message including information on the first PLMN to cope with the failure of the first PLMN of the first operator. When the inbound roaming UE receives the SIB message from the base station of the second PLMN, the inbound roaming UE recognizes that it has accessed the base station of the first PLMN. In this case, various management methods may occur in the network depending on whether or not there is a roaming agreement between operators, but the inbound roaming UE may not be aware of roaming to the second PLMN rather than the first PLMN. That is, the inbound roaming UE may send various requests to the network without understanding the charging policy or roaming restrictions in the second PLMN.

Accordingly, if an appropriate operation of the network is not performed, the utilization of network resources such as signaling waste and the user's service experience may be lowered.

<Device to which the Disclosure of the Present Specification can be Applied>

Hereinafter, a device to which the disclosure of the present specification can be applied will be described.

Figure 13:
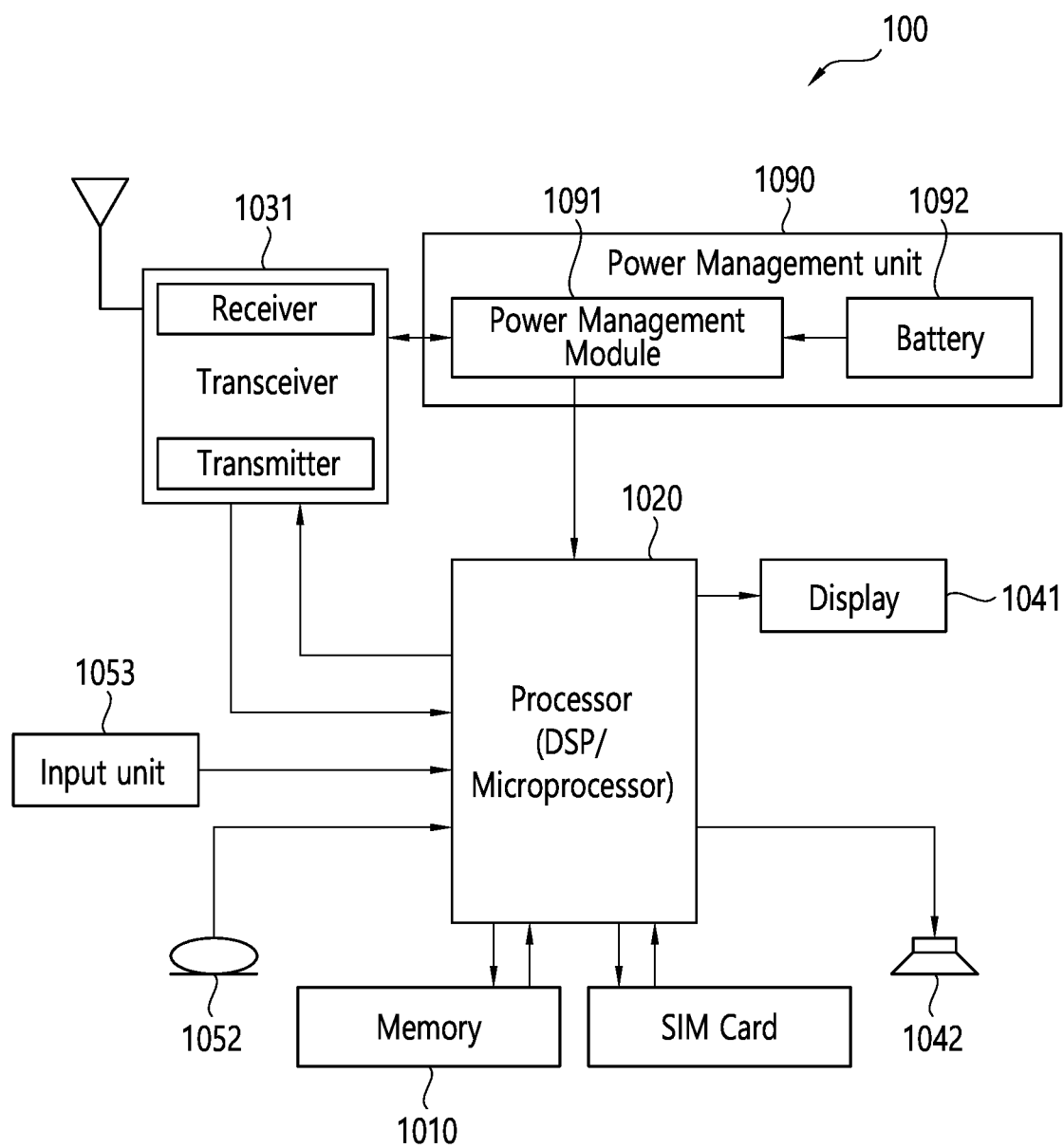
FIG. 13 is a block diagram of a UE according to an embodiment.

FIG. 13 is a block diagram of a UE according to an embodiment.

As can be seen with reference to FIG. 13, A UE 100 includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present specification. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a modulator and demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is coupled with the processor 1020 in a way to operate and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present specification may be implemented in a module (e.g., process, function, etc.) for performing the function described in the specification. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is connected to the processor 1020 in a way to operate and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 14:
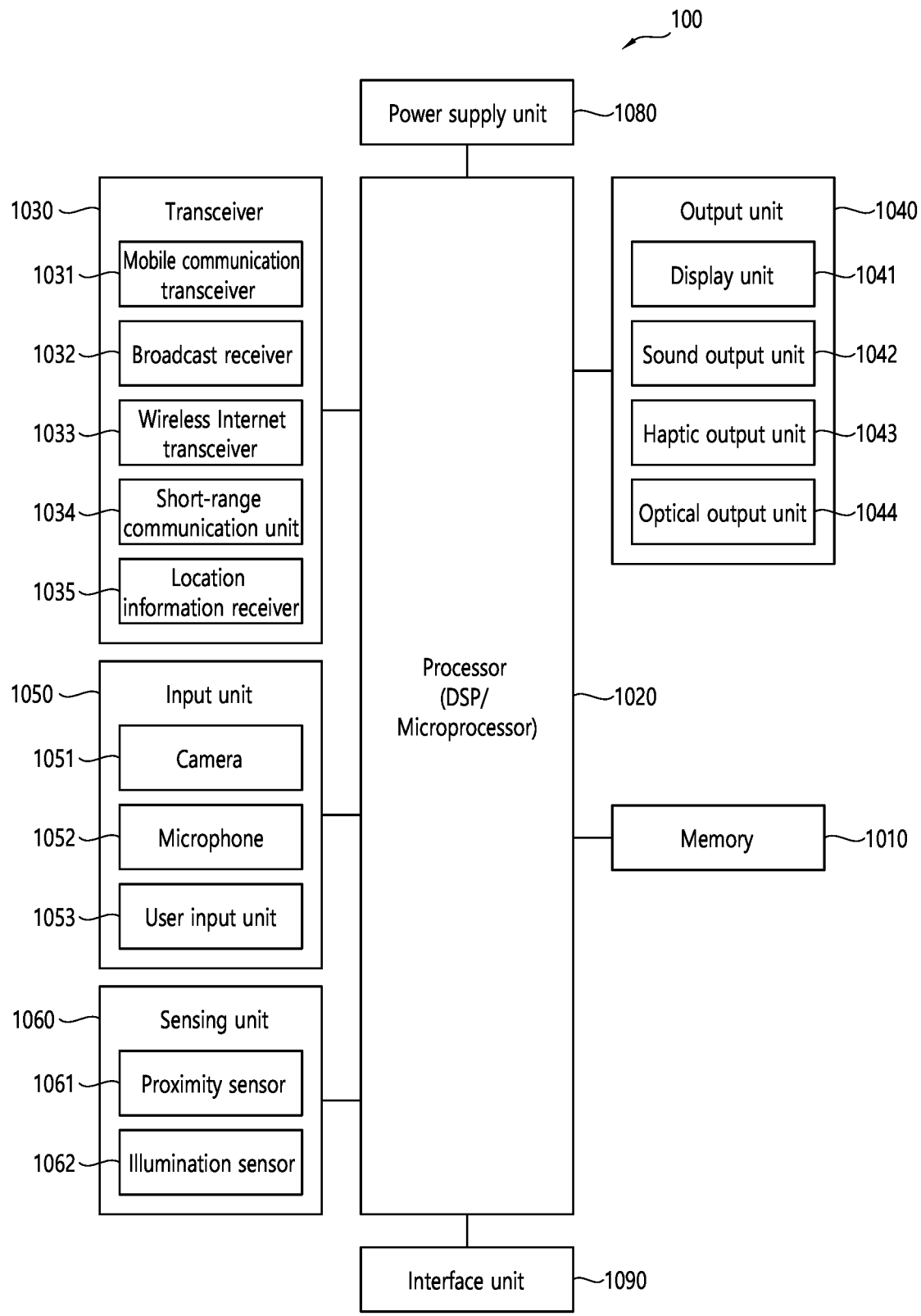
FIG. 14 is a block diagram showing the configuration of a UE shown in FIG. 13 in more detail.

FIG. 14 is a block diagram showing the configuration of a UE shown in FIG. 13 in more detail.

The terminal 100 may include a transceiver unit 1030, a processor 1020, a memory 1030, a sensing unit 1060, an output unit 1040, an interface unit 1090, an input unit 1050, and a power supply unit 1080, etc. Since the components shown in FIG. 14 are not essential for implementing the terminal, the terminal described in this specification may have more or fewer components than those listed above.

More specifically, among the components, the transceiver 1030 include one or more modules that enable wireless communication between the terminal 100 and the wireless communication system, between the terminal 100 and another terminal 100, or between the terminal 100 and an external server. In addition, the transceiver 1030 may include one or more modules for connecting the terminal 100 to one or more networks.

The transceiver 1030 may include at least one of a broadcast receiver 1032, a mobile communication transceiver 1031, a wireless Internet transceiver 1033, a short-range communication unit 1034, and a location information receiver 1035.

The input unit 1050 includes a camera 1051 or an image input unit for inputting an image signal, a microphone 1052 or an audio input unit for inputting an audio signal, and a user input unit 1053 for receiving information from a user, for example, a touch key, a push key (mechanical key), etc. The voice data or image data collected by the input unit 1050 may be analyzed and processed as a user's control command.

The sensing unit 1060 may include one or more sensors for sensing at least one of information in the mobile terminal, surrounding environment information surrounding the mobile terminal, and user information. For example, the sensing unit 1060 may include a proximity sensor 1061, an illumination sensor 1062, an illumination sensor, a touch sensor, an acceleration sensor, a magnetic sensor, gravity Sensor (G-sensor), gyroscope sensor, motion sensor, RGB sensor, infrared sensor (IR sensor: infrared sensor), fingerprint sensor (finger scan sensor), ultrasonic sensor, optical sensors (e.g., cameras 1051), microphones 1052, battery gauges, environmental sensors (e.g., barometers, hygrometers, thermometers, radiation sensors, It may include at least one of a thermal sensor, a gas sensor, etc.) and a chemical sensor (e.g., an electronic nose, a healthcare sensor, a biometric sensor, etc.). Meanwhile, the mobile terminal disclosed in the present specification may combine and utilize information sensed by at least two or more of these sensors.

The output unit 1040 is for generating an output related to visual, auditory or tactile sense, the output unit 1040 may include at least one of a display unit 1041, a sound output unit 1042, a haptic output unit 1043, and an optical output unit 1044. The display unit 1041 may implement a touch screen by forming a layer structure with the touch sensor each other or integrally formed with the touch sensor. Such a touch screen may function as a user input unit 1053 that provides an input interface between the terminal 100 and a user, and may provide an output interface between the terminal 100 and a user.

The interface unit 1090 serves as a passage with various types of external devices connected to the terminal 100. This interface unit 1090 may include at least one of a wired/wireless headset port (port), an external charger port (port), a wired/wireless data port (port), a memory card (memory card) port, a port connecting a device equipped with an identification module, an audio input/output (I/O) port, a video input/output (I/O) port, and an earphone port. Corresponding to the connection of the external device to the interface unit 1090, the terminal 100 may perform appropriate control related to the connected external device.

In addition, the memory 1030 stores data supporting various functions of the terminal 100. The memory 1030 may store a plurality of application programs (or applications) driven in the terminal 100, data for operation of the terminal 100, and commands. At least some of these application programs may be downloaded from an external server through wireless communication. Also, at least some of these application programs may exist on the terminal 100 from the time of shipment for basic functions (eg, functions for incoming calls, outgoing functions, message reception, and message outgoing functions) of the terminal 100. Meanwhile, the application program may be stored in the memory 1030, installed on the terminal 100, and driven by the processor 1020 to perform an operation (or function) of the mobile terminal.

The processor 1020 generally controls the overall operation of the terminal 100 in addition to the operation related to the application program. The processor 1020 may provide or process appropriate information or functions to a user by processing signals, data, information, etc. input or output through the above-described components or by driving an application program stored in the memory 1030.

In addition, the processor 1020 may control at least some of the aforementioned components in order to drive an application program stored in the memory 1030. Furthermore, the processor 1020 may operate by combining at least two or more of the components included in the terminal 100 to drive the application program.

The power supply unit 1080 receives external power and internal power under the control of the processor 1020 to supply power to each component included in the terminal 100. The power supply unit 1080 includes a battery, and the battery may be a built-in battery or a replaceable battery.

At least some of the respective components may operate in cooperation with each other to implement an operation, control, or control method of a mobile terminal according to various embodiments to be described below. In addition, the operation, control, or control method of the mobile terminal may be implemented on the mobile terminal by driving at least one application program stored in the memory 1030.

Hereinafter, before looking at various embodiments implemented through the terminal 100 as described above, the above-listed components will be described in more detail with reference to the drawings.

First, referring to the transceiver 1030, the broadcast receiver 1032 of the transceiver 1030 receives a broadcast signal and/or broadcast related information from an external broadcast management server through a broadcast channel. The broadcast channel may include a satellite channel and a terrestrial channel Two or more of the broadcast reception modules may be provided to the mobile terminal 100 for simultaneous broadcast reception or broadcast channel switching for at least two broadcast channels.

The mobile communication transceiver 1031 transmit and receive wireless signal with at least one of a base station, an external terminal, and a server on a mobile communication network constructed according to the technical standards or communication methods for mobile communication (e.g., Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), LTE Advanced (LTE-A), 3GPP New Radio access technology (NR), etc.).

The wireless signal may include various types of data according to transmission and reception of a voice call signal, a video call signal, or a text/multimedia message.

The wireless Internet transceiver 1033 refers to a module for wireless Internet access, and may be built-in or external to the terminal 100. The wireless Internet transceiver 1033 is configured to transmit and receive wireless signals in a communication network according to wireless Internet technologies.

As wireless Internet technologies, for example, Wireless LAN (WLAN), Wi-Fi, Wi-Fi Direct, Digital Living Network Alliance (DLNA), WiBro, WiMAX, HSDPA, HSUPA, LTE, LTE-A, 3GPP NR, and the like. The Internet transceiver 1033 transmits and receives data according to at least one wireless Internet technology within a range including Internet technologies not listed above.

From the point of view that wireless Internet access by WiBro, HSDPA, HSUPA, GSM, CDMA, WCDMA, LTE, LTE-A, 3GPP NR, etc., is made through a mobile communication network, the wireless Internet transceiver 1033 performing wireless Internet access through the mobile communication network may be understood as a type of the mobile communication transceiver 1031.

The short-range communication unit 1034 is for short-range communication, and may support short-distance communication by using at least one of Bluetooth™, Radio Frequency Identification (RFID), Infrared Data Association (IrDA), Ultra Wideband (UWB), ZigBee, Near Field Communication (NFC), Wi-Fi, Wi-Fi Direct, and Wireless Universal Serial Bus (USB) technologies. The short-distance communication unit 1034 may support wireless communication between the terminal 100 and the wireless communication system, between the terminal 100 and the other terminal 100, or between the terminal 100 and another network in which the other terminal (100, or external server) is located. The local area network may be wireless personal area networks.

Here, the other terminal 100 may be a wearable device capable of exchanging (or interworking) data with the terminal 100, e.g., a smart watch, a smart glass, neckband, Head Mounted Display (HMD). The short-range communication unit 1034 may detect (or recognize) a wearable device capable of communicating with the terminal 100 in the vicinity of the terminal 100. Furthermore, when the detected wearable device is a device authenticated to communicate with the terminal 100, the processor 1020 may transmit at least a portion of data processed by the terminal 100 to a wearable device through the short-range communication unit 1034. Accordingly, the user of the wearable device may use data processed by the terminal 100 through the wearable device. For example, according to this, when a call is received in the terminal 100, it is possible for the user to perform a phone call through the wearable device. When a message is received in the terminal 100, it is possible for the user to check the received message through the wearable device.

Furthermore, screen mirroring with a TV located in the house or a display inside a car is performed through the short-distance communication unit 1034, and a corresponding function is performed based on, for example, the MirrorLink or Miracast standard. In addition, it is also possible to directly control a TV or a display inside a vehicle by using the terminal 100.

The location information module 1035 is a module for acquiring a location (or current location) of a mobile terminal, and a representative example thereof includes a Global Positioning System (GPS) module or a Wireless Fidelity module. For example, if the mobile terminal utilizes a GPS module, it can acquire the location of the mobile terminal by using a signal transmitted from a GPS satellite. As another example, if the mobile terminal utilizes the Wi-Fi module, the location of the mobile terminal may be obtained based on information of the Wi-Fi module and a wireless Access Point (AP) that transmits or receives a wireless signal. If necessary, the location information module 1035 may perform any function of the other modules of the transceiver 1030 to obtain data on the location of the mobile terminal as a substitute or additionally. The location information module 1035 is a module used to obtain the location (or current location) of the mobile terminal, and is not limited to a module that directly calculates or obtains the location of the mobile terminal.

Each of the broadcast receiver 1032, the mobile communication transceiver 1031, the short-range communication unit 1034, and the location information module 1035 may be implemented as a separate module performing a corresponding function, and functions corresponding to two or more of the transceiver 1031, the short-range communication unit 1034, and the location information module 1035 may be implemented by one module.

Next, the input unit 1050 is for inputting image information (or signal), audio information (or signal), data, or information input from a user, for input of image information, the terminal 100 may be provided with one or a plurality of cameras 1051. The camera 1051 processes an image frame such as a still image or a moving image obtained by an image sensor in a video call mode or a photographing mode. The processed image frame may be displayed on the display unit 1041 or stored in the memory 1030. On the other hand, the plurality of cameras 1051 provided in the terminal 100 may be arranged to form a matrix structure, and through the cameras 1051 forming the matrix structure as described above, image information may be input to the terminal 100 has a plurality of cameras having various angles or focal points. In addition, the plurality of cameras 1051 may be arranged in a stereo structure to acquire a left image and a right image for realizing a stereoscopic image.

The microphone 1052 processes an external sound signal as electrical voice data. The processed voice data may be utilized in various ways according to a function (or a running application program) being performed by the terminal 100. Meanwhile, various noise removal algorithms for removing noise generated in the process of receiving an external sound signal may be implemented in the microphone 1052.

The user input unit 1053 is for receiving information from a user, and when information is input through the user input unit 1053, the processor 1020 may control the operation of the terminal 100 to correspond to the input information. The user input unit 1053 is a mechanical input means (or a mechanical key, for example, a button located on the front, rear or side of the terminal 100, a dome switch, a jog wheel, a jog switch, etc.) and a touch input means. As an example, the touch input means consists of a virtual key, a soft key, or a visual key displayed on the touch screen through software processing, or consists of a touch key (touch key) disposed on a part other than the touch screen. On the other hand, the virtual key or the visual key, is possible to be displayed on the touch screen while having various forms, for example, graphic, text, icon, video or a combination of these forms.

Meanwhile, the sensing unit 1060 senses at least one of information in the mobile terminal, surrounding environment information surrounding the mobile terminal, and user information, and generates a sensing signal corresponding thereto. The processor 1020 may control the driving or operation of the terminal 100 or perform data processing, functions, or operations related to an application program installed in the terminal 100 based on the sensing signal. Representative sensors among various sensors that may be included in the sensing unit 1060 will be described in more detail.

First, the proximity sensor 1061 refers to a sensor that detects the presence or absence of an object approaching a predetermined detection surface or an object existing in the vicinity without mechanical contact using the force of an electromagnetic field or infrared rays. The proximity sensor 1061 may be disposed in an inner region of the mobile terminal covered by the touch screen described above or in the vicinity of the touch screen.

Examples of the proximity sensor 1061 include a transmission type photoelectric sensor, a direct reflection type photoelectric sensor, a mirror reflection type photoelectric sensor, a high frequency oscillation type proximity sensor, a capacitive type proximity sensor, a magnetic type proximity sensor, an infrared proximity sensor, and the like. In the case where the touch screen is capacitive, the proximity sensor 1061 may be configured to detect the proximity of an object having conductivity as a change in an electric field according to the proximity of the object. In this case, the touch screen (or touch sensor) itself may be classified as a proximity sensor.

On the other hand, for convenience of description, the act of approaching an object on the touch screen without being in contact so that the object is recognized that it is located on the touch screen is called "proximity touch", and the act of actually touching an object on the screen is called "contact touch". The position where the object is touched in proximity on the touch screen means a position where the object is perpendicular to the touch screen when the object is touched in proximity. The proximity sensor 1061 may detect a proximity touch and a proximity touch pattern (e.g., proximity touch distance, proximity touch direction, proximity touch speed, proximity touch time, proximity touch position, proximity touch movement state, etc.). On the other hand, the processor 1020 processes data (or information) corresponding to the proximity touch operation and the proximity touch pattern detected through the proximity sensor 1061 as above, and further, print visual information corresponding to the processed data on the touch screen. Furthermore, the processor 1020 may control the terminal 100 to process different operations or data (or information) according to whether a touch to the same point on the touch screen is a proximity touch or a contact touch.

The touch sensor detects a touch (or touch input) applied to the touch screen (or the display unit 1041) using at least one of various touch methods such as a resistive film method, a capacitive method, an infrared method, an ultrasonic method, and a magnetic field method, etc.

As an example, the touch sensor may be configured to convert a change in pressure applied to a specific part of the touch screen or a change in capacitance occurring in a specific part of the touch screen into an electrical input signal. The touch sensor may be configured to detect a position in which a touch object applying a touch on the touch screen, an area, a pressure at the time of touch, an electrostatic capacitance at the time of touch, etc. Here, the touch object is an object that applies a touch to the touch sensor, and may be, for example, a finger, a touch pen or a stylus pen, a pointer, or the like.

As such, when there is a touch input to the touch sensor, a signal(s) corresponding thereto is sent to the touch controller. The touch controller processes the signal(s) and then sends the corresponding data to the processor 1020. Accordingly, the processor 1020 may know which area of the display unit 1041 has been touched, and the like. Here, the touch controller may be a component separate from the processor 1020, or may be the processor 1020 itself.

Meanwhile, the processor 1020 may perform different controls or may perform the same control according to the type of the touch object that touches the touch screen (or a touch key provided other than the touch screen). Whether to perform different control or the same control according to the type of the touch object may be determined according to the current operating state of the terminal 100 or a running application program.

On the other hand, the touch sensor and the proximity sensor described above are independently or in combination, may sense various types of touch such as, a short (or tap) touch, a long touch, a multi touch, and a drag touch, flick touch, pinch-in touch, pinch-out touch, swipe touch, hovering touch, etc.

The ultrasonic sensor may recognize location information of a sensing target by using ultrasonic waves. Meanwhile, the processor 1020 may calculate the position of the wave source based on information sensed by the optical sensor and the plurality of ultrasonic sensors. The position of the wave source may be calculated using the property that light is much faster than ultrasonic waves, that is, the time at which light reaches the optical sensor is much faster than the time at which ultrasonic waves reach the ultrasonic sensor. More specifically, the position of the wave source may be calculated by using a time difference from the time that the ultrasonic wave arrives using light as a reference signal.

On the other hand, the camera 1051 as described in terms of the components of the input unit 1050 includes at least one of a camera sensor (e.g., CCD, CMOS, etc.), a photo sensor (or an image sensor), and a laser sensor.

The camera 1051 and the laser sensor may be combined with each other to detect a touch of a sensing target for a 3D stereoscopic image. The photo sensor may be stacked on the display device, and the photo sensor is configured to scan the motion of the sensing target close to the touch screen. More specifically, the photo sensor mounts photo diodes and transistors (TRs) in rows/columns and scans the contents placed on the photo sensors using electrical signals that change according to the amount of light applied to the photo diodes. That is, the photo sensor calculates the coordinates of the sensing target according to the amount of change in light, and through this, location information of the sensing target can be obtained.

The display unit 1041 displays (outputs) information processed by the terminal 100. For example, the display unit 1041 may display execution screen information of an application program driven in the terminal 100 or User Interface (UI) and Graphic User Interface (GUI) information according to the execution screen information.

Also, the display unit 1041 may be configured as a stereoscopic display unit for displaying a stereoscopic image.

A three-dimensional display method such as a stereoscopic method (glasses method), an auto stereoscopic method (glasses-free method), or a projection method (holographic method) may be applied to the stereoscopic display unit.

The sound output unit 1042 may output audio data received from the transceiver 1030 or stored in the memory 1030 in a call signal reception, a call mode or a recording mode, a voice recognition mode, a broadcast reception mode, and the like. The sound output unit 1042 also outputs a sound signal related to a function (e.g., a call signal reception sound, a message reception sound, etc.) performed in the terminal 100. The sound output unit 1042 may include a receiver, a speaker, a buzzer, and the like.

The haptic module 1530 generates various tactile effects that the user can feel. A representative example of the tactile effect generated by the haptic output unit 1043 may be vibration. The intensity and pattern of vibration generated by the haptic output unit 1043 may be controlled by a user's selection or setting of a processor. For example, the haptic output unit 1043 may synthesize and output different vibrations or output them sequentially.

In addition to vibration, the haptic output unit 1043 may generate various tactile effects such as a pin arrangement that moves vertically with respect to the contact skin surface, a jet or suction force of air through a nozzle or an inlet, a touch on the skin surface, contact of an electrode, an electrostatic force, effect caused by heat absorption and the effect of reproducing a feeling of coolness and warmth using an element capable of absorbing heat or generating heat, etc.

The haptic output unit 1043 may not only deliver a tactile effect through direct contact, but may also be implemented so that the user can feel the tactile effect through a muscle sensation such as a finger or arm. Two or more haptic output units 1043 may be provided according to the configuration of the terminal 100.

The light output unit 1044 outputs a signal for notifying the occurrence of an event by using the light of the light source of the terminal 100. Examples of the event generated in the terminal 100 may be message reception, call signal reception, missed call, alarm, schedule notification, email reception, information reception through an application, and the like.

The signal output from the optical output unit 1044 is implemented as the mobile terminal emits light of a single color or a plurality of colors toward the front or rear side. The signal output may be terminated when the mobile terminal detects the user's event confirmation.

The interface unit 1090 serves as a passage with all external devices connected to the terminal 100. The interface unit 1090 receives data from an external device, receives power and transmits it to each component inside the terminal 100, or allows data inside the terminal 100 to be transmitted to an external device. For example, a wired/wireless headset port, an external charger port, a wired/wireless data port, a memory card port, a port for connecting a device equipped with an identification module (port), an audio I/O port, a video I/O port, an earphone port, etc. may be included in the interface unit 1090.

On the other hand, the identification module is a chip storing various information for authenticating the use authority of the terminal 100, the identification module may include a User Identification Module (UIM), a Subscriber Identification Module (SIM), a Universal Subscriber Identification Module (USIM) and the like. A device equipped with an identification module (hereinafter, 'identification device') may be manufactured in the form of a smart card. Accordingly, the identification device may be connected to the terminal 100 through the interface unit 1090.

In addition, the interface unit 1090 may be a path through which power from the cradle is supplied to the terminal 100 when the terminal 100 is connected to an external cradle, or a path through which various commands signal input from the cradle by the user transmitted to the terminal 100. Various command signals or the power input from the cradle may be operated as signals for recognizing that the terminal 100 is correctly mounted on the cradle.

The memory 1030 may store a program for the operation of the processor 1020, and may temporarily store input/output data (e.g., a phone book, a message, a still image, a moving image, etc.). The memory 1030 may store data related to vibrations and sounds of various patterns output when a touch input is performed on the touch screen.

The memory 1030 may include at least one type of storage medium such as a flash memory type, a hard disk type, a Solid State Disk (SSD) type, a Silicon Disk Drive (SDD) type, and a multimedia card micro type, card-type memory (such as SD or XD memory), Random Access Memory (RAM), Static Random Access Memory (SRAM), Read-Only Memory (ROM), Electrically Erasable Programmable Read-Only Memory (EEPROM), a Programmable Read-Only Memory (PROM), a magnetic memory, a magnetic disk, and an optical disk. The terminal 100 may be operated in relation to a web storage that performs a storage function of the memory 1030 on the Internet.

Meanwhile, as described above, the processor 1020 controls the operation related to the application program and the general operation of the terminal 100 in general. For example, if the state of the mobile terminal satisfies a set condition, the processor 1020 may execute or release a lock state that restricts input of a user's control command to applications.

In addition, the processor 1020 may perform control and processing related to voice calls, data communication, video calls, etc., or perform pattern recognition processing capable of recognizing handwriting input or drawing input performed on the touch screen as text and images, respectively. Furthermore, the processor 1020 may control any one or a plurality of the components described above in combination to implement various embodiments described below on the terminal 100.

The power supply unit 1080 receives external power and internal power under the control of the processor 1020 to supply power necessary for operation of each component. The power supply unit 1080 includes a battery, and the battery may be a built-in battery configured to be rechargeable, and may be detachably coupled to the terminal body for charging or the like.

In addition, the power supply unit 1080 may include a connection port, and the connection port may be configured as an example of the interface 1090 to which an external charger that supplies power for charging the battery is electrically connected.

As another example, the power supply unit 1080 may be configured to charge the battery in a wireless manner without using the connection port. In this case, power can be transmitted to the power supply unit 1080 uses one or more of an inductive coupling method based on a magnetic induction phenomenon or a resonance coupling method based on an electromagnetic resonance phenomenon from an external wireless power transmitter.

Meanwhile, various embodiments below may be implemented in, for example, a computer-readable recording medium using software, hardware, or a combination thereof.

On the other hand, the mobile terminal can be extended to a wearable device that can be worn on the body beyond the dimension that the user mainly holds in the hand. Such wearable devices include a smart watch, smart glass, and (HMD and the like. Hereinafter, examples of mobile terminals extended to wearable devices will be described.

The wearable device may be configured to be able to exchange (or interwork) data with another terminal 100. The short-range communication unit 1034 may detect (or recognize) a wearable device capable of communicating around the terminal 100. Furthermore, when the detected wearable device is a device authenticated to communicate with the terminal 100, the processor 1020 may transmit at least a portion of data processed in the terminal 100 to the wearable device through the short-range communication unit 1034. Accordingly, the user may use data processed by the terminal 100 through the wearable device. For example, it is possible to perform a phone call through the wearable device when a call is received in the terminal 100, or to check the received message through the wearable device when a message is received to the terminal 100.

Disclosure of the Present Specification

The disclosure of the present specification may be implemented by a combination of one or more of the following configurations. In the case of the embodiment below, an embodiment is shown to show each individual configuration, but an embodiment in which one or more combinations are configured together may be implemented.

Hereinafter, an EPS-based embodiment will be described, but the content disclosed by the present specification is also applicable to an embodiment implemented in 5GS.

In the present specification, a special roaming situation mode of the UE (i.e., not a normal roaming situation, but a roaming situation that operates to overcome the failure situation as described above) is defined. For ease of description in the present specification, general roaming will be referred to as N-roaming, and roaming that operates to overcome the failure situation will be referred to as Special roaming (S-roaming) or Emergency roaming (E-roaming).

As described in the above problem, if the UE does not understand the S-roaming or E-roaming (i.e., roaming operation to overcome a failure situation) situation, it recognizes it as a non-roaming situation and operates. If the UE recognizes the S-roaming situation through the methods described below, the UE may operate in the S-roaming mode preset by the operator. The operator's settings may be pre-configured or transmitted to the UE through an Open Mobile Alliance (OMA)—Device Management (DM) scheme or a policy delivery scheme. The operator's settings may be updated as necessary.

For example, in the S-roaming situation, the operator may set the inbound roaming UE to allow requests for voice and SMS, but limit data service requests. In addition, the operator may set the priority of random access by a specific application of the inbound roaming UE differently from the general situation. Alternatively, for the purpose of adjusting the signal load, the operator may change the period of the Periodic Tracking Area Update (P-TAU) of the UE, or may set the non-essential request from the periodic operation of the UE to be delayed.

I. A Method for Supporting an Inbound Roaming UE in a Failure Situation

I-1. Network Behavior

The inbound roaming UE (i.e., the subscriber of the third PLMN) recognizes that the access request message has been sent to the network of the first PLMN via the base station of the first PLMN (In general, since roaming of the first PLMN is set to be prioritized according to the roaming agreement, information on the first PLMN may be received and preferentially attempted to access the first PLMN). However, actually, the access request message of the inbound roaming UE is transmitted to the network of the second PLMN via the base station of the second PLMN that is instead temporarily transmitting information on the first PLMN.

1-1-A. A Method of Inducing Access to Another PLMN by Rejecting an Access Request from an Inbound Roaming UE According to the roaming agreement among the operator of the first PLMN, the operator of the second PLMN, and the operator of the third PLMN, the network node receiving the access request from the inbound roaming UE may reject the access of the UE by using a cause field in the NAS message, etc. In this case, the cause field or another field in the NAS message may explicitly or implicitly indicate that S-roaming (i.e., roaming to overcome a failure situation) can be performed.

When the UE performs an operation for selecting another PLMN, the network node may transmit additional information to preferentially prefer the second PLMN or a specific PLMN.

In addition, the information may be temporary information so that the UE can select the first PLMN again in another region/after a certain time period. That is, the network node may specify that the information is temporary information. That is, even if another PLMN is selected from the viewpoint of the UE, if the region/time information is changed, the priority of the previous PLMN selection may be followed again.

I-1-B. A Method for Accommodating the Access Request of the UE

I-1-B-1. When there is a roaming agreement between the operator of the second PLMN and the operator of the third PLMN According to the roaming agreement among the operator of the first PLMN, the operator of the second PLMN, and the operator of the third PLMN, the network node of the second PLMN may not create a route of a Home Routed (HR) roaming scheme to the network node of the first PLMN. Instead, the network node of the second PLMN performs operations for directly providing a service.

In addition, the network node of the second PLMN may perform operations for reallocation of the network node and change of the base station in order to perform optimal service.

The network node of the second PLMN informs the UE that it is connected to the second PLMN. In this case, the network node of the second PLMN may provide information on the failure status of the first PLMN or information on the possibility of occurrence of the S-roaming situation to the UE. The information may be utilized later when the UE selects or reselects a PLMN. Additionally, the information may be set as temporary information so that the UE can select the first PLMN again in another region/after a certain period of time. That is, the network node of the second PLMN may inform the UE that the information is temporary information.

According to the roaming agreement, since the service provided by the second PLMN may be limited compared to the service provided by the first PLMN, this information may be provided to the UE. The information may be delivered to the UE through a NAS message, or may be delivered through a pop-up window, etc., after a successful connection to the SMS/MMS and server access of a specific application service.

I-1-B-2. When there is no roaming agreement between the second PLMN and the third PLMN (however, in order to cope with the occurrence of a failure of the first PLMN, there is an agreement between the first PLMN and the third PLMN for a countermeasure for failure (using the second PLMN))

According to the roaming agreement between the operator of the first PLMN, the operator of the second PLMN, and the operator of the third PLMN, the network node of the second PLMN may create a route of HR scheme to the network node of the first PLMN, and perform operations to provide a service to the inbound roaming UE.

Additionally, for authentication of subscribers without a roaming agreement, the second PLMN network node may perform authentication via the network node of the first PLMN. Alternatively, even if there is no roaming service agreement, a business agreement can be made in advance to access the mutual subscriber information Data Base (DB) in these special obstacles.

When generating charging data of the network, since the service is not simply provided through the first PLMN, charging information for the service through the second PLMN may be explicitly collected and notified to the third PLMN.

The network may perform different policies for services provided per PLMN.

The network node of the second PLMN informs the UE that it is connected to the second PLMN. In this case, the network node of the second PLMN may provide information on the failure status of the first PLMN or information on the possibility of occurrence of the S-roaming situation to the UE. The information may be utilized later when the UE selects or reselects a PLMN. Additionally, the information may be set as temporary information so that the UE can select the first PLMN again in another region/after a certain period of time. That is, the network node of the second PLMN may inform the UE that the information is temporary information.

According to the roaming agreement, since the service provided by the second PLMN may be limited compared to the service provided by the first PLMN, this information may be provided to the UE. The information may be delivered to the UE through a NAS message, or may be delivered through a pop-up window, etc., after a successful connection to the SMS/MMS and server access of a specific application service.

Figure 15:
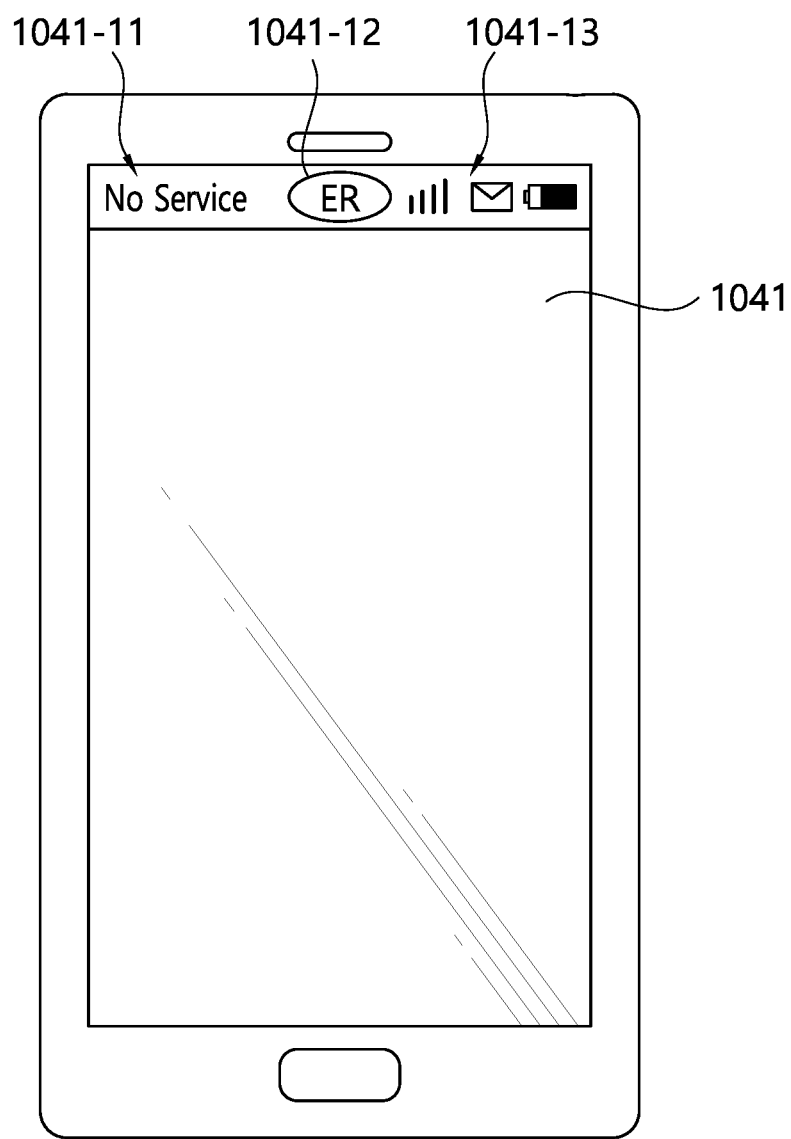
FIG. 15 is an exemplary diagram illustrating a screen of a UE according to an embodiment.

FIG. 15 is an exemplary diagram illustrating a screen of a UE according to an embodiment.

Referring to FIG. 15, when roaming is performed to cope with the failure situation as described above, unlike the roaming icon generally displayed, the processor of the UE may display an icon 1041-12 for indicating a corresponding situation (i.e., a situation in which S-roaming or E-roaming is performed to cope with the failure situation) on a status bar displayed on the display unit 1041. The icon 1041-12 may indicate that it has been switched to the roaming mode to cope with the failure situation or may mean that a specific roaming policy is applied. The icon 1041-12 may be an ER indicating emergency roaming or an SR indicating special roaming.

The icon 1041-12 may have a different shape from a general icon (i.e., an icon indicating a state of simply receiving information or recognizing such a state). Alternatively, although the shape is the same, the display shape may be different. For example, the icon 1041-12 may be displayed while blinking, but the general icon may be displayed without blinking.

Meanwhile, various icons representing different information may be displayed on the display unit 1041. In addition, as described above, these various icons may be differently changed in shape, form (e.g., blinking), color, etc., of the display (e.g., icon, notification window, etc.) according to the recognition of the UE and the application level of the roaming mode.

In addition, information 1041-13 indicating the signal strength from the base station of the second PLMN may be displayed on the status bar displayed on the display unit 1041 according to roaming to cope with the failure situation.

Also, information 1041-11 indicating that the service of the first PLMN is impossible (e.g., No Service) may be displayed on the status bar displayed on the display unit 1041.

Figure 16:
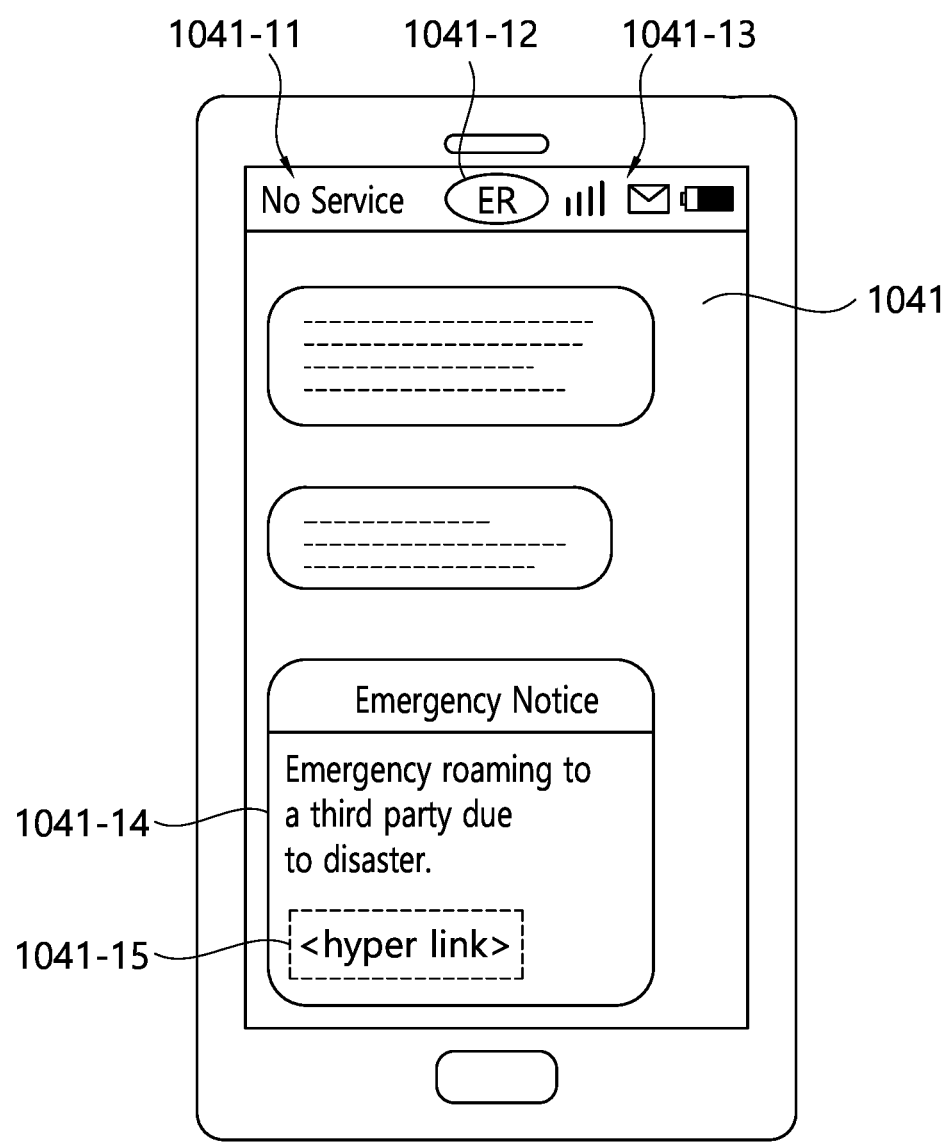
FIG. 16 is an exemplary diagram illustrating a screen of a UE according to an embodiment.

FIG. 16 is an exemplary diagram illustrating a screen of a UE according to an embodiment.

When the UE is successfully connected to the network, the UE may display a message 1041-14 on the display unit 1041 indicating that roaming has been performed to cope with a failure situation. That is, the UE may display the message 1041-14 received from the server on the display unit 1041. In this case, information on available services (e.g., a list of voice calls, text services, and limited data services, etc.) may be displayed in the message 1041-14 along with a description of the corresponding roaming mode situation. Here, in the message 1041-14, a hyperlink 1041-15 for notifying detailed information, such as the content of each service, may be displayed. When the hyperlink 1041-15 is selected (e.g., when the hyperlink 1041-15 is touched by the user), a connection to a server capable of providing the corresponding content is performed. That is, a PDN connection request from the UE to the corresponding server may occur.

In addition, information 1041-13 indicating the signal strength from the base station of the second PLMN may be displayed on the status bar displayed on the display unit 1041 according to roaming. Also, information 1041-11 indicating that the service of the first PLMN is impossible (e.g., No Service) may be displayed on the status bar displayed on the display unit 1041.

I-2. UE Operation

The UE recognizes the S-roaming situation based on the information received from the network node.

The UE (if necessary) performs PLMN selection again.

In managing the priority of roaming PLMN selection, the UE manages the PLMN for S-roaming received from the network node and temporary rejection by the network node, in addition to general priority management.

The UE performs an operation of switching to the S-roaming mode or applying the policy of the S-roaming mode according to a preset operator policy.

As described above, when the UE recognizes the S-roaming situation, the UE may display information for notifying the S-roaming.

Figure 17:
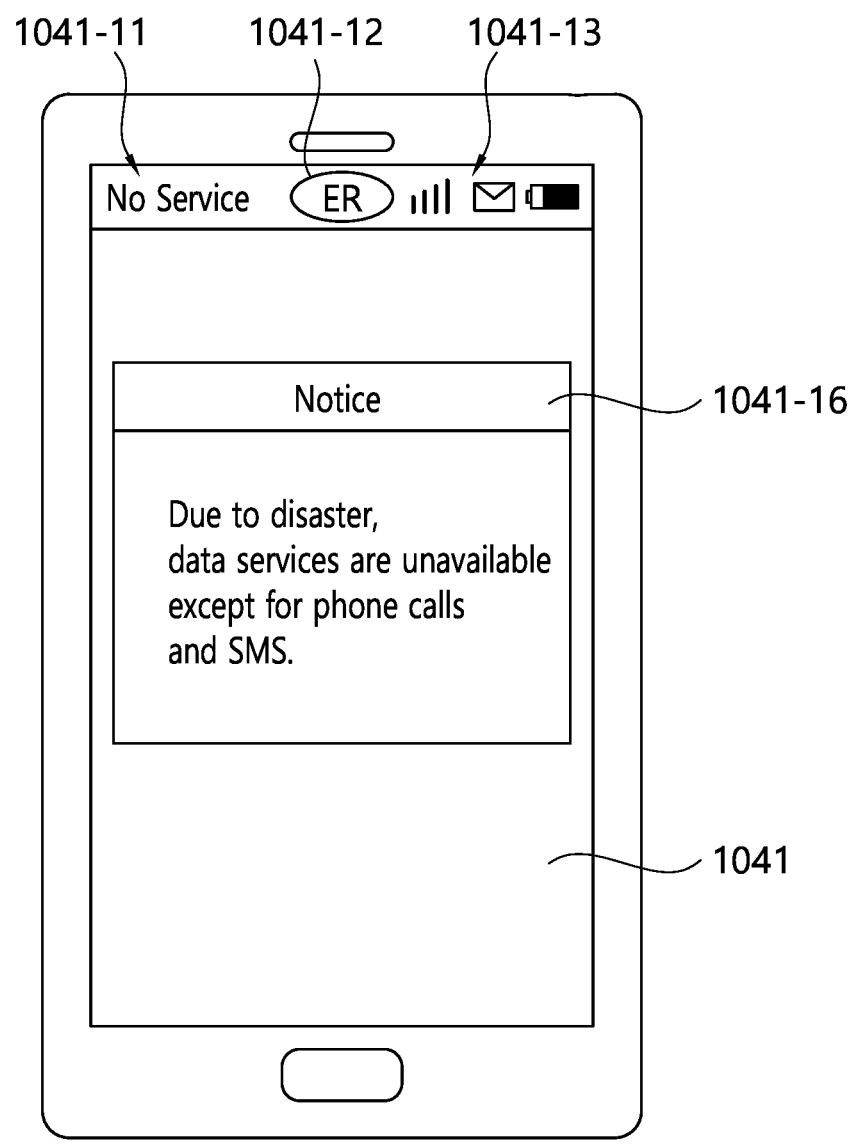
FIG. 17 is an exemplary diagram illustrating a screen of a UE.

FIG. 17 is an exemplary diagram illustrating a screen of a UE.

Referring to FIG. 17, the UE may display a message 1041-16 indicating that roaming has been performed to cope with a failure situation on the display unit 1041.

In addition, information 1041-13 indicating the signal strength from the base station of the second PLMN may be displayed on the status bar displayed on the display unit 1041 according to roaming. Also, information 1041-11 indicating that the service of the first PLMN is impossible (e.g., No Service) may be displayed on the status bar displayed on the display unit 1041.

Meanwhile, information on available services may be displayed in the message 1041-16 along with a description of the corresponding roaming Specifically, the message may indicate that only voice calls, text services, and limited data services are available, and other services are unavailable.

Figure 18:
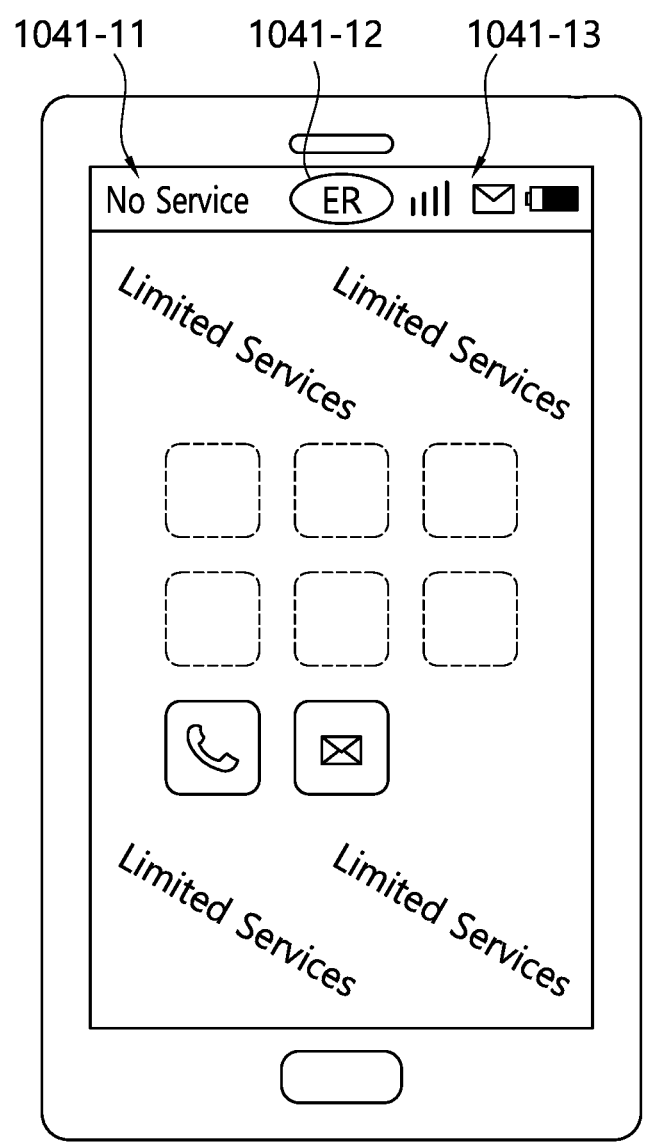
FIG. 18 is an exemplary diagram illustrating applications of a UE.

FIG. 18. is an exemplary diagram illustrating applications of a UE.

As can be seen with reference to FIG. 18, when S-roaming or E-roaming is performed to cope with a failure situation, the UE may operate in a predetermined mode for S-roaming or E-Roaming, e.g., a safe mode provided by Microsoft's Windows. The screen according to the predetermined operation mode may have different resolution, color, and font like the safe mode screen of a Windows PC.

Specifically, when S-roaming or E-roaming is performed to cope with a failure situation, the UE may not display icons of all installed applications, but only display icons of executable applications (e.g., a phone application and a text message application). That is, icons of non-executable applications may not be displayed at all. Alternatively, icons of non-executable applications may be displayed in shades or black and white or transparent, while icons of executable applications may be displayed in color.

In addition, the UE may display a preset background screen image instead of a background screen image designated by the user. Alternatively, as shown, the UE may display information indicating that only a limited service is available in the background screen image.

If the user executes the phone application, the UE may display a screen as shown in FIG. 18.

Figure 19:
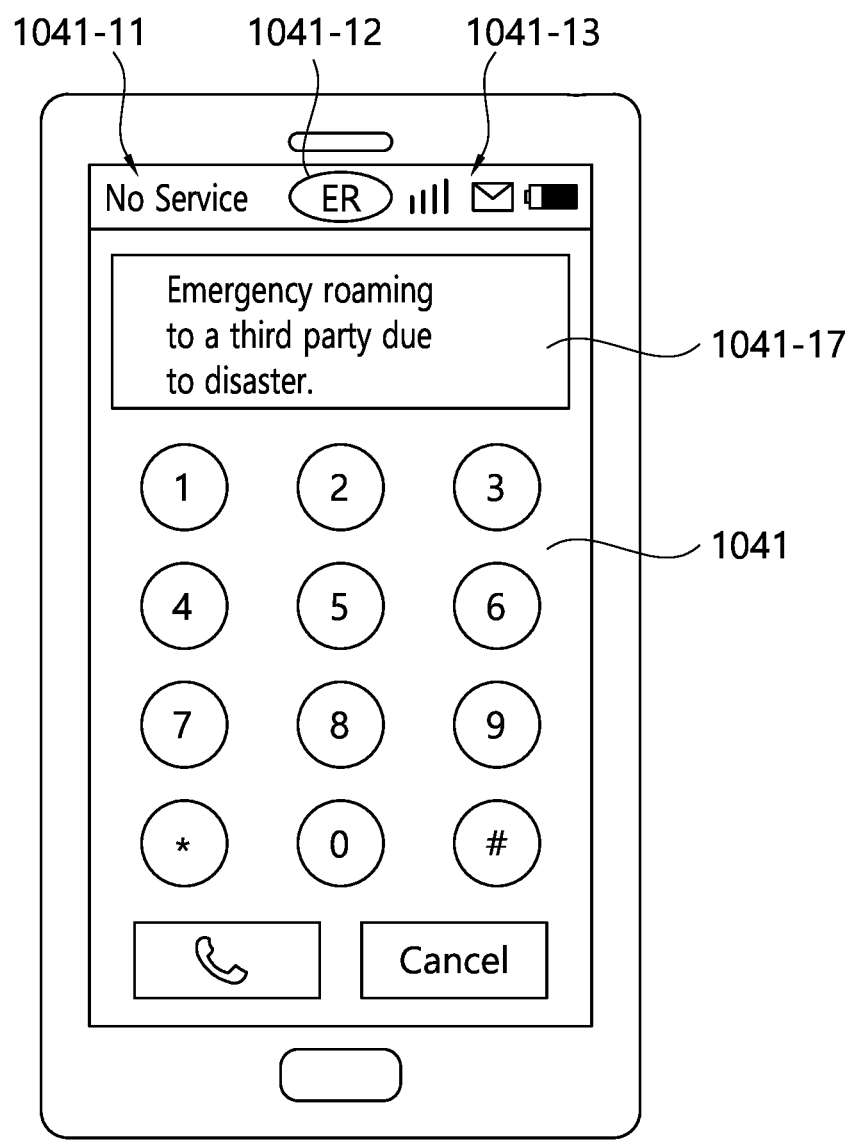
FIG. 19 is an exemplary diagram illustrating a screen displayed by a phone application executed in a UE.

FIG. 19 is an exemplary diagram illustrating a screen displayed by a phone application executed in a UE.

Referring to FIG. 19, information 1041-16 indicating that roaming has been performed in order to cope with a failure situation may be displayed on a screen displayed by a phone application executed in the UE.

That is, a guide saying that the emergency roaming to a third party has been performed due to a failure situation may be displayed on the screen displayed by the phone application executed in the UE.

Also, an icon 1041-12 indicating that roaming has been performed to cope with a failure situation may be displayed on the status bar displayed on the display unit 1041.

In addition, information 1041-13 indicating the signal strength from the base station of the second PLMN may be displayed on the status bar displayed on the display unit 1041 according to roaming Also, information 1041-11 indicating that the service of the first PLMN is impossible (e.g., No Service) may be displayed on the status bar displayed on the display unit 1041.

If an application other than the phone call and message is executed by the user, the screen of the corresponding application may display a notification message, a pop-up message, or a guide message informing that the application is unavailable.

Meanwhile, as described above, the predetermined mode for S-roaming or E-roaming may be applied when set by a user as described below.

Figure 20:
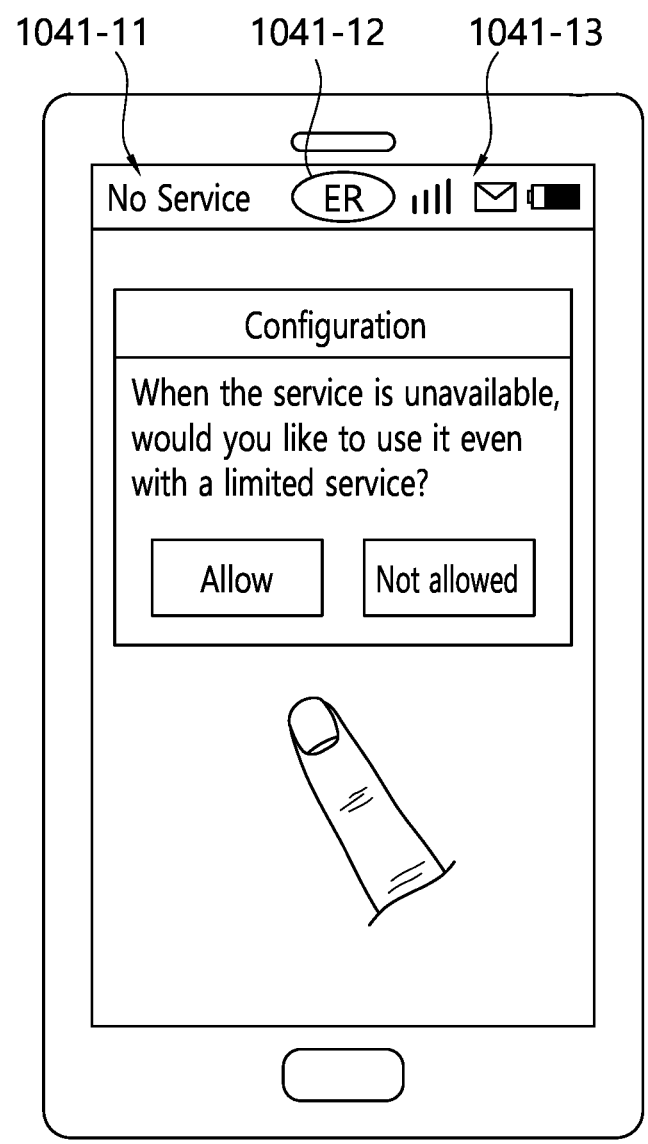
FIG. 20 is an exemplary diagram illustrating a setting screen of a UE.

FIG. 20 is an exemplary diagram illustrating a setting screen of a UE.

As shown in FIG. 20, when the service is unavailable due to a failure of the first PLMN, after roaming to the second PLMN, the UE may display a screen for receiving input of a user's setting as to whether to use a limited service. When the user inputs permission, and when the first PLMN becomes unavailable due to a failure, a screen may be displayed as shown in FIGS. 15 to 19.

Figure 21:
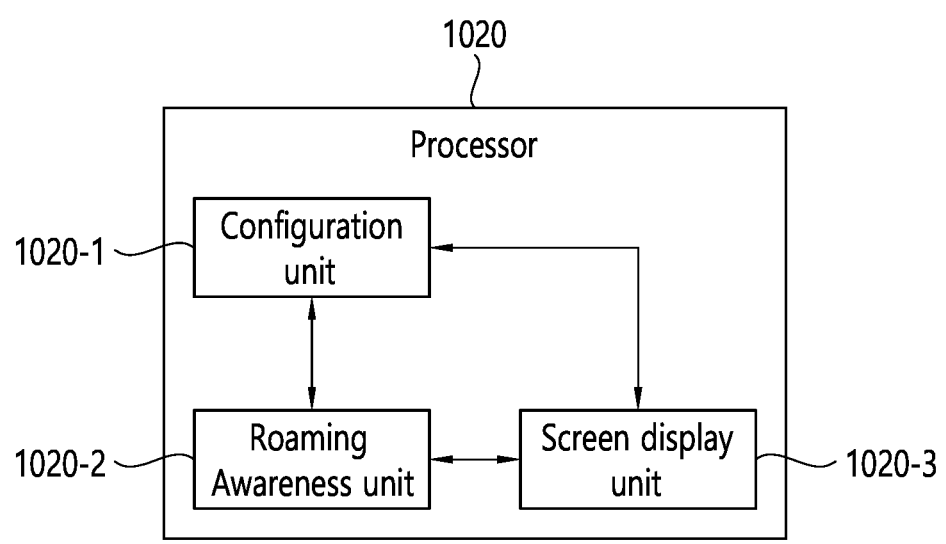
FIG. 21 is a detailed block diagram of a processor of a UE for implementing the examples shown in FIGS. 15 to 20.

FIG. 21 is a detailed block diagram of a processor of a UE for implementing the examples shown in FIGS. 15 to 20.

As can be seen with reference to FIG. 21, the processor 1020 of the UE may include a configuration unit 1020-1, a roaming awareness unit 1020-2, and a screen display unit 1020-3.

The configuration unit 1020-1 receives and stores a user's setting as to whether or not to use a limited service as shown in FIG. 20, when roaming to the second PLMN is performed because the first PLMN is unavailable due to a failure.

The roaming awareness unit 1020-2 recognizes whether or not roaming to the second PLMN is performed when the service is unavailable in the first PLMN due to a failure.

The screen display unit 1020-3 may display a screen as shown in FIGS. 15 to 19.

Figure 22A:
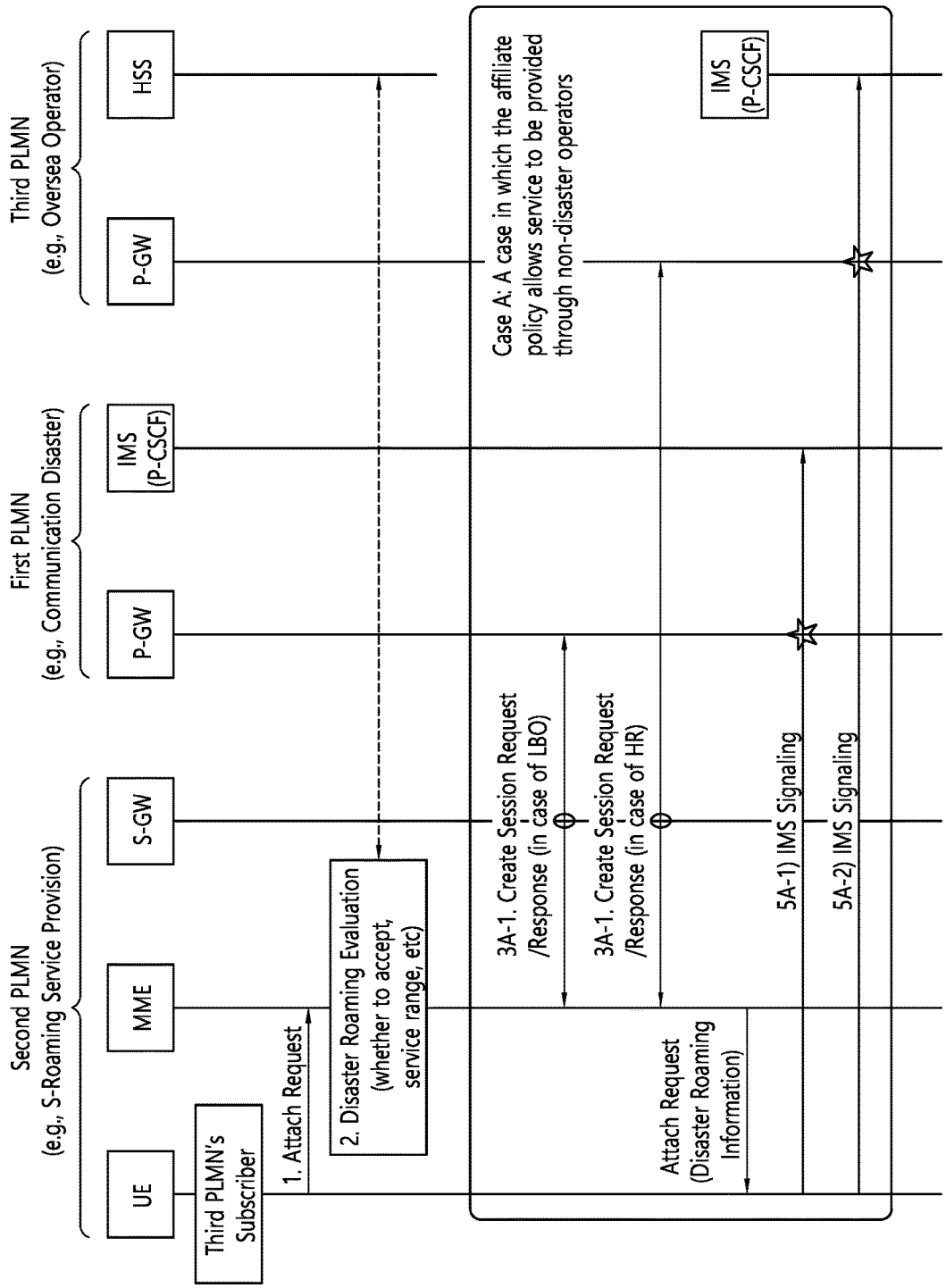
FIG. 22a and FIG. 22b show an embodiment in which the disclosure of the present specification is applied to EPS.
Figure 22B:
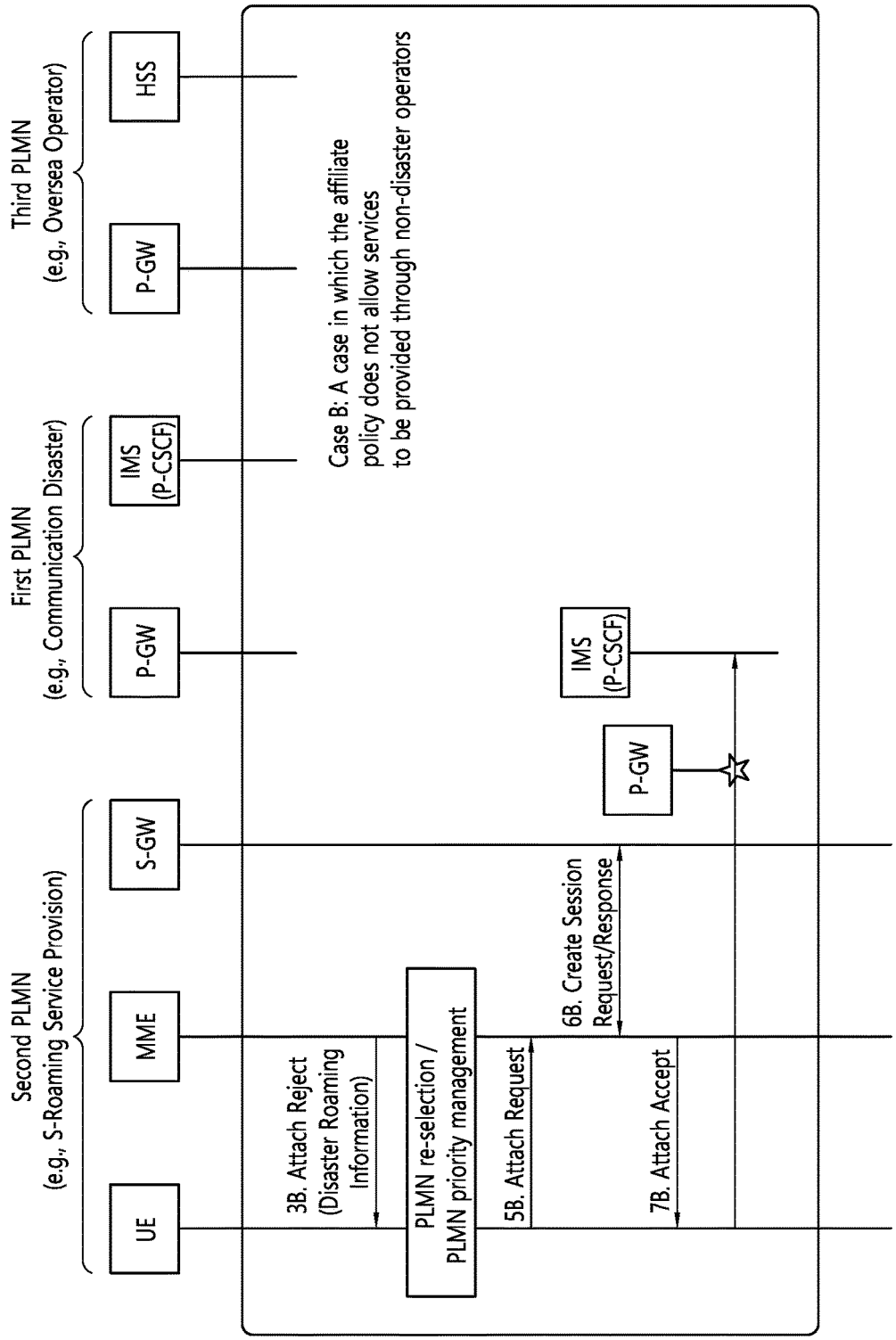

FIG. 22a and FIG. 22b show an embodiment in which the disclosure of the present specification is applied to EPS.

In FIG. 22a and FIG. 22b, it is assumed that there is a roaming agreement between the first PLMN and the third PLMN, and a subscriber of the third PLMN can access the first PLMN to receive a roaming service.

In addition, in FIG. 22a and FIG. 22b, it is assumed that a communication service is impossible due to a communication disaster in the first PLMN, and the base station of the second PLMN temporarily transmits information of the first PLMN on behalf of the first PLMN according to a pre-configured policy and operator command (e.g., OAM-based command).

1) The UE receives the information of the first PLMN transmitted by the base station of the second PLMN, and transmits an attach request message to attempt access. The UE thinks it is access to the first PLMN, but actually transmits an attach request message to the MME of the second PLMN via the base station of the second PLMN.

2) The MME of the second PLMN evaluates whether disaster roaming is present. The MME of the second PLMN performs interaction with the HSS of the third PLMN, which is the HPLMN of the UE, in order to check the subscriber information of the UE, and checks the configured or pre-configured operator policies and roaming policies, etc. If necessary, interaction with other network nodes, such as PCRF, may be performed to check operator policies.

Through this process, it is determined whether to accept the access for providing the disaster roaming service of the UE requesting access and the range of the disaster roaming service that can be provided (e.g., a basic voice call and a specific service, etc.).

Case A: A case in which the affiliate policy allows service to be provided through non-disaster operator The roaming agreement between the first PLMN and the third PLMN may include, in the event of a communication disaster in addition to the basic roaming service, allowing some or all services such as voice calls to be provided via some network nodes of another operator network (e.g., the second PLMN).

3A) The MME of the second PLMN processes the access request (i.e., attach request) of the UE, which is a subscriber of the third PLMN, as in the case where the subscriber of the first PLMN requests access, and performs a procedure for establishing a PDN connection for service provision.

That is, the MME of the second PLMN performs an LBO or HR procedure according to the APN and operator policy to establish a PDN connection for the UE based on the roaming service providing technology.

3A-1) When the roaming service is provided by the LBO scheme, the MME of the second PLMN exchanges a create session request/response message with the P-GW of the first PLMN, which is the local PLMN.

3A-2) When the roaming service is provided by the HR scheme, the MME of the second PLMN exchanges create session request/response messages with the P-GW of the third PLMN, which is the HPLMN of the UE.

4A) After successfully establishing the PDN connection, the MME of the second PLMN transmits an attach accept message to the UE. In this case, information on disaster roaming may be explicitly or implicitly included.

For reference, based on the information, the UE may indicate information on the disaster roaming to the user (e.g., indication on the display unit).

5A) IMS signaling is transmitted to an IMS network (e.g., P-CSCF) through the established PDN connection, and a voice service may be provided to the UE.

5A-1) When the roaming service is provided by the LBO scheme, IMS signaling is transmitted to the IMS network of the first PLMN via the S-GW of the second PLMN and the P-GW of the first PLMN, which is the Local PLMN.

5A-2) When the roaming service is provided by the HR scheme, IMS signaling is transmitted to the IMS network of the third PLMN through the S-GW of the second PLMN and the P-GW of the third PLMN, which is the HPLMN.

Case B: When the affiliate policy does not allow services to be provided through non-disaster operators, roaming services may not be provided to cope with disasters.

3B) In the disaster roaming evaluation of step 2, upon checking the roaming agreement, it was decided not to accept disaster roaming. The MME of the second PLMN transmits an attach reject message to the UE. In this case, information on disaster roaming may be explicitly or implicitly included.

4B) Upon receiving the attach reject message, the UE evaluates the reason for rejection of the message and then performs PLMN re-selection. The UE manages the priority of the PLMN based on the disaster roaming information received in step 3. For example, in the case of a PLMN in which disaster roaming has occurred, control such as temporarily/for a specific period of time lowering priority is included.

5B) The UE transmits an attach request message to the newly selected PLMN. In this embodiment, it is assumed and described that the newly selected PLMN is the second PLMN.

6B) The MME of the second PLMN performs a procedure for establishing a PDN connection.

7B) After the PDN connection is successfully established, the MME of the second PLMN transmits an attach accept message to the UE.

8B) IMS signaling is transmitted to an IMS network (e.g., P-CSCF) through the established PDN connection, and a voice service may be provided. In this embodiment, IMS signaling is transmitted to the IMS network of the second PLMN via the S-GW and the P-GW of the second PLMN.

Figure 23A:
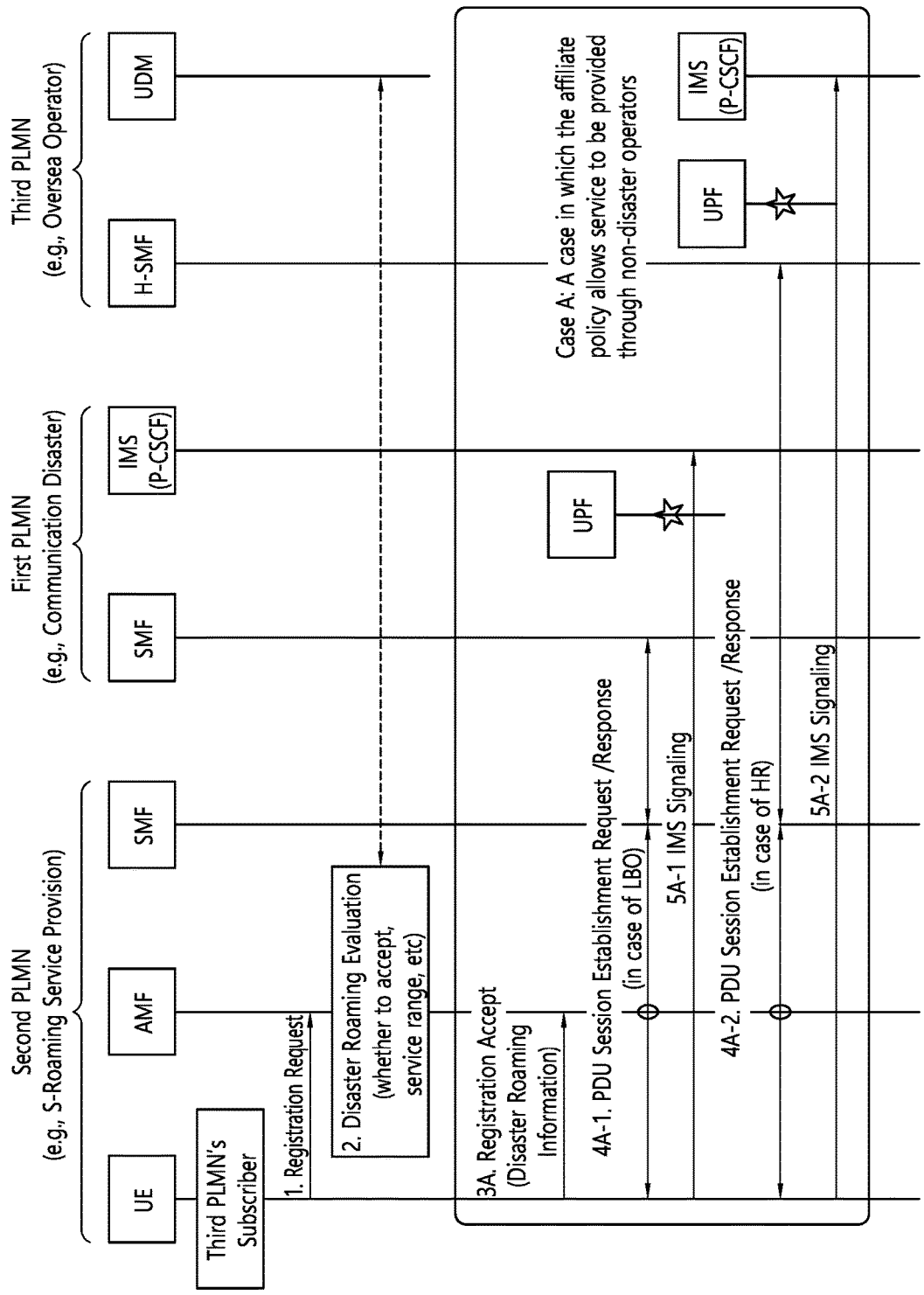
FIG. 23a and FIG. 23b show an embodiment in which the disclosure of the present specification is applied to 5GS.
Figure 23B:
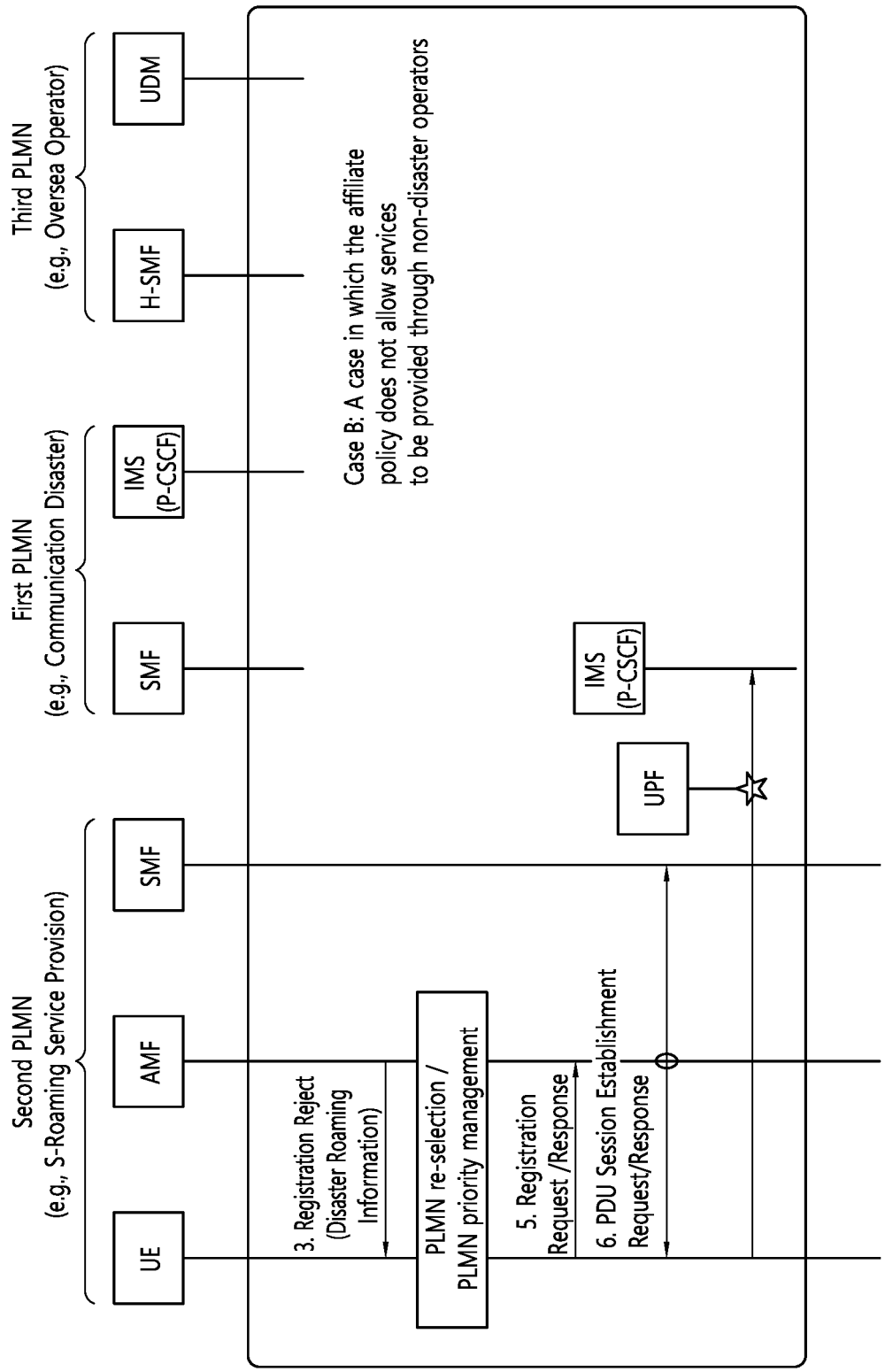

FIG. 23a and FIG. 23b show an embodiment in which the disclosure of the present specification is applied to 5GS.

In FIG. 23a and FIG. 23b, it is assumed that there is a roaming agreement between the first PLMN and the third PLMN, and a subscriber of the third PLMN can access the first PLMN to receive a roaming service.

In addition, in FIG. 23a and FIG. 23b, it is assumed that a communication service is impossible due to a communication disaster in the first PLMN, and the base station of the second PLMN temporarily transmits information of the first PLMN on behalf of the first PLMN according to a pre-configured policy and operator command (e.g., OAM-based command)

1) The UE receives the information of the first PLMN transmitted by the base station of the second PLMN, and transmits a registration request message to attempt access. The UE thinks it is access to the first PLMN, but actually transmits a registration request message to the AMF of the second PLMN via the base station of the second PLMN.

2) The AMF of the second PLMN evaluates whether disaster roaming is present. The AMF of the second PLMN performs interaction with the UDM of the third PLMN, which is the HPLMN of the UE, in order to check the subscriber information of the UE, and checks the configured or pre-configured operator policies and roaming policies, etc. If necessary, interaction with other network nodes, such as PCF, may be performed to check operator policies.

Through this process, it is determined whether to accept the access for providing the disaster roaming service of the UE requesting access and the range of the disaster roaming service that can be provided (e.g., a basic voice call and a specific service, etc.).

Case A: A case in which the affiliate policy allows service to be provided through non-disaster operator The roaming agreement between the first PLMN and the third PLMN may include, in the event of a communication disaster in addition to the basic roaming service, allowing some or all services such as voice calls to be provided via some network nodes of another operator network (e.g., the second PLMN).

3A) The AMF of the second PLMN processes the registration request message of the UE, which is a subscriber of the third PLMN, as in the case where the subscriber of the first PLMN requests access, and transmits a registration accept message. In this case, information on disaster roaming may be explicitly or implicitly included.

For reference, based on the information, the UE may indicate information on the disaster roaming to the user (e.g., indication on the display unit).

4A) The UE transmits the PDU session establishment request message to the SMF via the AMF. Based on the roaming service providing technology, the LBO or HR procedure is performed according to the DNN and operator policy for establishing the PDU session requested by the UE.

Here, the difference from the examples of FIG. 22a and FIG. 22b is that the SMF may perform disaster roaming evaluation. That is, since the SMF can allow a service only for a specific session, the range of the service can be determined in this step.

4A-1) When roaming service is provided by the LBO scheme, the AMF of the second PLMN communicates with the SMF of the second PLMN, and the SMF of the second PLMN transmits/receives messages to communicate with the SMF of the first PLMN, which is the local PLMN. In this case, the SMF of the second PLMN serves as an Intermediate SMF (I-SMF). Alternatively, according to a deployment option for disaster roaming, the AMF of the second PLMN transmits/ receives messages for direct communication with the SMF of the first PLMN, which is a local PLMN.

4A-2) When roaming service is provided by the HR scheme, the AMF of the second PLMN communicates with the SMF of the second PLMN, and the SMF of the first PLMN transmits/receives messages to communicate with the SMF of the third PLMN, which is the HPLMN of the UE. In this case, the SMF of the second PLMN serves as a Visited SMF (V-SMF). Alternatively, according to a deployment option for disaster roaming, the AMF of the second PLMN transmits/receives messages for direct communication with the SMF of the third PLMN, which is the HPLMN of the UE.

5A) IMS signaling is transmitted to an IMS network (e.g., P-CSCF) through the established PDU session, and a voice service may be provided to the UE.

5A-1) When the roaming service is provided by the LBO scheme, IMS signaling is transmitted to the IMS network of the first PLMN via the UPF of the second PLMN and the UPF of the first PLMN, which is the local PLMN.

5A-2) When the roaming service is provided by the HR scheme, IMS signaling is transmitted to the IMS network of the third PLMN through the UPF of the second PLMN and the UPF of the third PLMN, which is the HPLMN.

Case B: When the affiliate policy does not allow services to be provided through non-disaster operators, roaming services may not be provided to cope with disasters.

3B) In the disaster roaming evaluation of step 2, upon checking the roaming agreement, it was decided not to accept disaster roaming. The AMF of the second PLMN transmits a registration reject message to the UE. In this case, information on disaster roaming may be explicitly or implicitly included.

4B) Upon receiving the registration reject message, the UE evaluates the reason for rejection of the message and then performs PLMN re-selection. The UE manages the priority of the PLMN based on the disaster roaming information received in step 3. For example, in the case of a PLMN in which disaster roaming has occurred, control such as temporarily/for a specific period of time lowering priority is included.

5B) The UE transmits a registration request message to the newly selected PLMN. In this embodiment, it is assumed and described that the newly selected PLMN is the second PLMN.

6B) After the registration is successfully performed, the UE performs a procedure for establishing a PDU session.

7B) IMS signaling is transmitted to an IMS network (e.g., P-CSCF) through the established PDU session, and a voice service may be provided. In this embodiment, IMS signaling is transmitted to the IMS network of the second PLMN via the UPF of the second PLMN.

Summary of the Disclosure of the Present Specification

A disclosure of the present specification provides a method of accessing another Public Land Mobile Network (PLMN) instead of a subscribed third PLMN. According to the method, the UE may access a second PLMN providing a service on behalf of a first PLMN which has a roaming agreement with the third PLMN. And according to the method, the UE may display information indicating access to the second PLMN on a screen. The second PLMN may provide only a limited service.

The displayed information may be an icon or an indicator on a status bar displayed on the screen of the UE.

The displayed information may be a signal strength from a base station of the second PLMN.

The displaying of the information may comprise displaying that a signal strength from a base station of the first PLMN is lowest instead of displaying a signal strength from a base station of the second PLMN.

The displayed information may be a message indicating that the first PLMN is not serviceable so the second PLMN has been accessed.

The message may include a list of limited services provided by the second PLMN.

The method may further comprise displaying icons of applications using services not provided by the second PLMN differently from other icons.

The method may further comprise displaying icons of applications using services not provided by the second PLMN in shade, black and white, or transparently.

The method may further comprise displaying only icons of applications using services provided by the second PLMN.

The services provided by the second PLMN may include at least one of a call service, a message service, and a limited data service.

A disclosure of the present specification provides a UE accessing another Public Land Mobile Network (PLMN) instead of a subscribed third PLMN. The UE may include a transceiver configured to access a second PLMN providing a service on behalf of a first PLMN which has a roaming agreement with the third PLMN. The UE may include a display unit configured to display information indicating access to the second PLMN on a screen of the UE. The second PLMN may provide only a limited service.

<Scenarios to which the Disclosure of the Present Specification is Applicable>

Hereinafter, scenarios to which the present disclosure is applicable are described.

Figure 24:
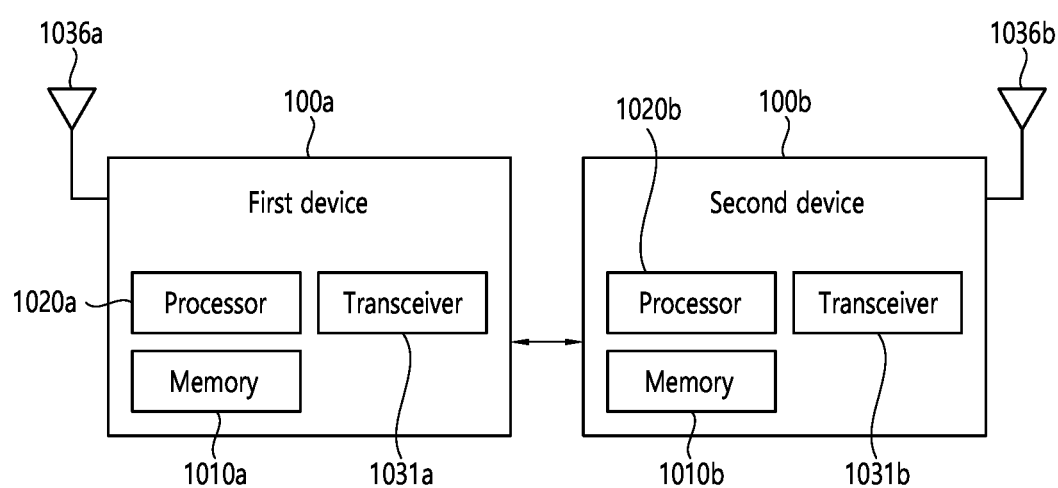
FIG. 24 illustrates a wireless communication system according to an embodiment.

FIG. 24 illustrates a wireless communication system according to an embodiment.

Referring to FIG. 24, the wireless communication system may include a first device 100*a* and a second device 100*b*.

The first device 100*a* may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an Internet-of-Things (IoT) device, a medical device, a FinTech device (or financial device), a security device, a climate/environment device, a device related to 5G service or a device related to the fourth industrial revolution field.

The second device 100*b* may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an Internet-of-Things (IoT) device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or point of sales (POS). For example, the climate/environment device may include a device for monitoring or predicting the climate/environment.

The first device 100a may include at least one processor such as a processor 1020a, at least one memory such as memory 1010a, and at least one transceiver such as a transceiver 1031a. The processor 1020a may perform the above-described functions, procedures, and/or methods. The processor 1020a may perform one or more protocols. For example, the processor 1020a may perform one or more layers of a radio interface protocol. The memory 1010a is connected to the processor 1020a, and may store various forms of information and/or instructions. The transceiver 1031a is connected to the processor 1020a, and may be controlled to transmit and receive radio signals.

The second device 100b may include at least one processor such as a processor 1020b, at least one memory device such as memory 1010b, and at least one transceiver such as a transceiver 1031b. The processor 1020b may perform the above-described functions, procedures and/or methods. The processor 1020b may implement one or more protocols. For example, the processor 1020b may implement one or more layers of a radio interface protocol. The memory 1010b is connected to the processor 1020b, and may store various forms of information and/or instructions. The transceiver 1031b is connected to the processor 1020b and may be controlled transmit and receive radio signals.

The memory 1010a and/or the memory 1010b may be connected inside or outside the processor 1020a and/or the processor 1020b, respectively, and may be connected to another processor through various technologies, such as a wired or wireless connection.

The first device 100a and/or the second device 100b may have one or more antennas. For example, an antenna 1036a and/or an antenna 1036b may be configured to transmit and receive radio signals.

Figure 25:
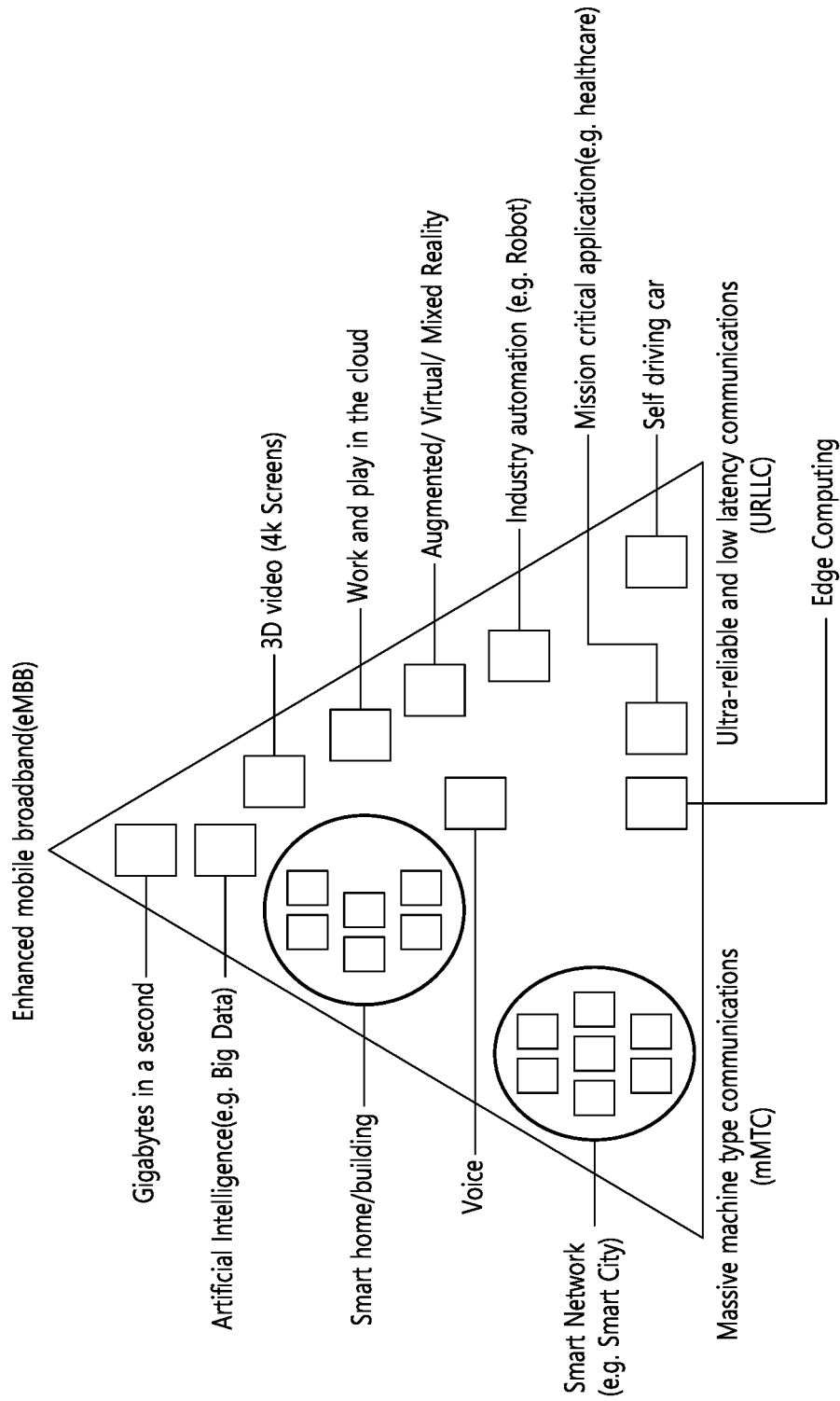
FIG. 25 illustrates an example of 5G use scenarios.

FIG. 25 illustrates an example of 5G use scenarios.

The 5G usage scenarios illustrated in FIG. 25 are merely exemplary, and the technical features of the present specification may also be applied to other 5G usage scenarios that are not illustrated in FIG. 25.

Referring to FIG. 25, three major requirement areas of 5G include: (1) an enhanced Mobile Broadband (eMBB) area, (2) a massive Machine Type Communication (mMTC) area, and (3) an Ultra-Reliable and Low Latency Communications (URLLC) area. Some examples of usage may require multiple areas for optimization, while other examples of usage may focus only on one Key Performance Indicator (KPI). The 5G supports these various examples of usage in a flexible and reliable way.

The eMBB focuses generally on improvements in data rate, latency, user density, and capacity and coverage of mobile broadband access. The eMBB aims at a throughput of about 10 Gbps. The eMBB makes it possible to far surpass basic mobile Internet access, and covers full-duplex operations, media in cloud or augmented reality, and entertainment applications. Data is one of the key drivers of 5G, and it may not be possible to see dedicated voice services for the first time in the 5G era. In 5G, voice is expected to be processed as an application program simply using data connection provided by a communication system. A main reason for an increased traffic volume is an increase in content size and an increase in the number of applications requiring high data rates. Streaming services (audio and video), interactive video and mobile Internet connections will become more prevalent as more devices are connected to the Internet. Many of these applications require always-on connectivity to push real-time information and notifications to users. Cloud storage and applications are rapidly increasing in mobile communication platforms, which may be applied to both work and entertainment. Cloud storage is a special use case that drives the growth of uplink data rates. 5G is also used for remote work in the cloud and requires much lower end-to-end latency to maintain a good user experience when tactile interfaces are used. In entertainment, for example, cloud gaming and video streaming are another key factor requiring improvement in mobile broadband capabilities. Entertainment is essential on smartphones and tablets anywhere, including in highly mobile environments such as trains, cars and airplanes. Another use case is augmented reality and information retrieval for entertainment. Here, augmented reality requires very low latency and an instantaneous data amount.

The mMTC, which is designed to enable communication between a large number of low-cost devices powered by batteries, is provided to support smart metering, logistics, fields, and applications such as body sensors. The mMTC aims at about 10-year batteries and/or about one million devices per $km^2$. The mMTC enables seamless connection of embedded sensors in all fields to form a sensor network and is one of the most anticipated 5G use cases. Potentially, IoT devices are predicted to reach 20.4 billion by 2020. Smart networks utilizing industrial IoT is one of the areas where 5G plays a key role in enabling smart cities, asset tracking, smart utilities, agriculture and security infrastructure.

The URLLC, which enables devices and machines to communicate with high reliability, very low latency, and high availability, are ideal for vehicle communications, industrial control, factory automation, telesurgery, smart grid, and public safety applications. The URLLC aims at a delay of about 1 ms. The URLLC includes new services that will change the industry through ultra-reliable/low-latency links such as remote control of key infrastructures and autonomous vehicles. Levels of reliability and latency are essential for smart grid control, industrial automation, robotics, and drone control and adjustment.

Next, a plurality of usage examples included in the triangle of FIG. 25 will be described in more detail.

5G, which is a means of providing streams that are rated as hundreds of megabits per second to a gigabit per second, may complement Fiber-To-The-Home (FTTH) and cable-based broadband (or Data Over Cable Service Interface Specifications (DOCSIS)). Such a high speed may be required to deliver TVs with resolution of 4K or higher (6K, 8K and higher) as well as Virtual Reality (VR) and Augmented Reality (AR). VR and AR applications involve almost immersive sports events. Specific applications may require special network configuration. For example, in the case of VR games, a game company may need to integrate a core server with an edge network server of a network operator to minimize latency.

Automotive is expected to be an important new driver for 5G together with many use cases for mobile communication regarding vehicles. For example, entertainment for passengers require both high capacity and high mobile broadband. The reason is because future users will continue to expect high-quality connections, regardless of their location and speed. Another use case in the automotive sector is an augmented reality dashboard. The augmented reality dashboard allows drivers to identify objects in the dark on top of what they see through a front window. The augmented reality dashboard superimposes information to be provided to the driver regarding a distance and movement of objects. In the future, wireless modules will enable communication between vehicles, exchange of information between a vehicle and a supporting infrastructure, and exchange of information between a vehicle and other connected devices (e.g., devices carried by pedestrians). A safety system may lower the risk of accidents by guiding the driver to alternative courses of action to make driving safer. A next step will be a remotely controlled vehicle or an autonomous vehicle. This requires very reliable and very fast communication between different autonomous vehicles and/or between vehicles and infrastructure. In the future, autonomous vehicles will perform all driving activities and drivers will be forced to focus only on traffic anomalies that the vehicle itself cannot identify. The technical requirements of autonomous vehicles require ultra-low latency and ultra-fast reliability to increase traffic safety to levels that cannot be achieved by humans.

Smart cities and smart homes referred to as smart society will be embedded with high-density wireless sensor networks as an example of smart networks. A distributed network of intelligent sensors will identify the conditions for cost and energy efficient maintenance of a city or home. A similar setup may be done for each household. Temperature sensors, window and heating controllers, burglar alarms, and home appliances are all wirelessly connected. Many of these sensors typically require low data rates, low power, and low cost. However, for example, real-time HD video may be required in certain types of devices for surveillance.

The consumption and distribution of energy including heat or gas is highly decentralized, requiring automated control of distributed sensor networks. A smart grid interconnects these sensors using digital information and communication technologies to collect information and act accordingly. This information may include the behavior of suppliers and consumers, so that the smart grid may improve efficiency, reliability, economical efficiency, sustainability of production, and a distribution of fuels such as electricity in an automated manner. The smart grid may also be considered as another low-latency sensor network.

A health sector has many applications that may benefit from mobile communications. The communication system may support telemedicine providing clinical care from remote locations. This may help reduce barriers to distance and improve access to medical services that are not consistently available in remote rural areas. It is also used to save lives in critical care and emergencies. A wireless sensor network based on mobile communication may provide remote monitoring and sensors for parameters such as a heart rate and blood pressure.

Wireless and mobile communications are becoming increasingly important in industrial applications. Wiring is expensive to install and maintain. Thus, a possibility of replacing cables with reconfigurable wireless links is an attractive opportunity for many industries. However, achieving this requires that a wireless connection operates with a delay, reliability and capacity similar to those of a cable and requires simplified management. Low latency and very low error probability are new requirements that need to be connected to 5G.

Logistics and cargo tracking is an important use case for mobile communications that enables tracking of inventory and packages from anywhere using a location-based information system. Logistics and freight tracking use cases typically require low data rates but require a wide range and reliable location information.

<Artificial Intelligence (AI)>

Artificial intelligence refers to a field of studying artificial intelligence or a methodology for creating the same, and machine learning refers to a field of defining various problems dealing in an artificial intelligence field and studying methodologies for solving the same. The machine learning may be defined as an algorithm for improving performance with respect to a certain task through repeated experiences with respect to the task.

An Artificial Neural Network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value.

The ANN may include an input layer, an output layer, and optionally one or more hidden layers. Each layer includes one or more neurons, and the ANN may include neurons and synapses connecting neurons. In the ANN, each neuron may output a function value of an activation function for input signals input through a synapse, a weight, and a bias.

A model parameter means a parameter determined through learning, and includes the weight of the synaptic connection and the bias of the neuron. In addition, the hyperparameter refers to a parameter that should be set before learning in a machine learning algorithm, and includes a learning rate, the number of iterations, a mini-batch size, an initialization function, etc.

The purpose of learning the ANN can be seen as determining the model parameters that minimize the loss function. The loss function may be used as an index for determining optimal model parameters in the learning process of the ANN.

Machine learning can be classified into supervised learning, unsupervised learning, and reinforcement learning according to a learning method.

Supervised learning may refer to a method of training the ANN in a state where a label for training data. The label may refer a correct answer (or result value) that the ANN should infer when training data is input to the ANN. Unsupervised learning may refer to a method of training the ANN in a state where no labels are given for training data. Reinforcement learning may refer to a learning method in which an agent defined in a certain environment learns to select an action or sequence of actions that maximizes the cumulative reward in each state.

Among ANNs, machine learning implemented as a Deep Neural Network (DNN) including a plurality of hidden layers is also called deep learning, and deep learning is a part of machine learning. Hereinafter, machine learning is used in a sense including deep learning.

<Robot>

A robot may refer to a machine which automatically handles a given task by its own ability, or which operates autonomously. Particularly, a robot that functions to recognize an environment and perform an operation according to its own judgment may be referred to as an intelligent robot.

Robots may be classified into, for example, industrial, medical, household, and military robots, according to the purpose or field of use.

A robot may include an actuator or a driving unit including a motor in order to perform various physical operations, such as moving joints of the robot. In addition, a movable robot may include, for example, a wheel, a brake, and a propeller in the driving unit thereof, and through the driving unit, may thus be capable of traveling on the ground or flying in the air.

<Self-Driving or Autonomous-Driving>

Autonomous driving refers to self-driving technology, and an autonomous vehicle refers to a vehicle that moves without any manipulation by a user or with minimum manipulation by a user.

For example, autonomous driving may include all of a technology for keeping a vehicle within a driving lane, a technology for automatically controlling a speed such as an adaptive cruise control, a technology for automatically driving the vehicle along a determined route, and a technology for, when a destination is set, automatically setting a route and driving the vehicle along the route.

A vehicle includes a vehicle having only an internal combustion engine, a hybrid vehicle having both an internal combustion engine and an electric motor, and an electric vehicle having only an electric motor, and may include not only an automobile but also a train, a motorcycle, or the like.

In this case, an autonomous vehicle may be considered as a robot with an autonomous driving function.

<Extended Reality; XR>

Extended reality collectively refers to Virtual Reality (VR), Augmented Reality (AR), and Mixed Reality (MR). The VR technology provides real world objects or backgrounds only in CG images, the AR technology provides virtual CG images together with real object images, and the MR technology is computer graphic technology for mixing and combining virtual objects with the real world.

The MR technology is similar to the AR technology in that both real and virtual objects are shown together. However, there is a difference in that a virtual object is used to complement a real object in the AR technology, whereas a virtual object and a real object are used in an equivalent nature in the MR technology.

The XR technology may be applied to a Head-Mount Display (HMD), a Head-Up Display (HUD), a mobile phone, a tablet PC, a laptop, a desktop, a TV, digital signage, etc. A device to which the XR technology is applied may be referred to as an XR device.

Figure 26:
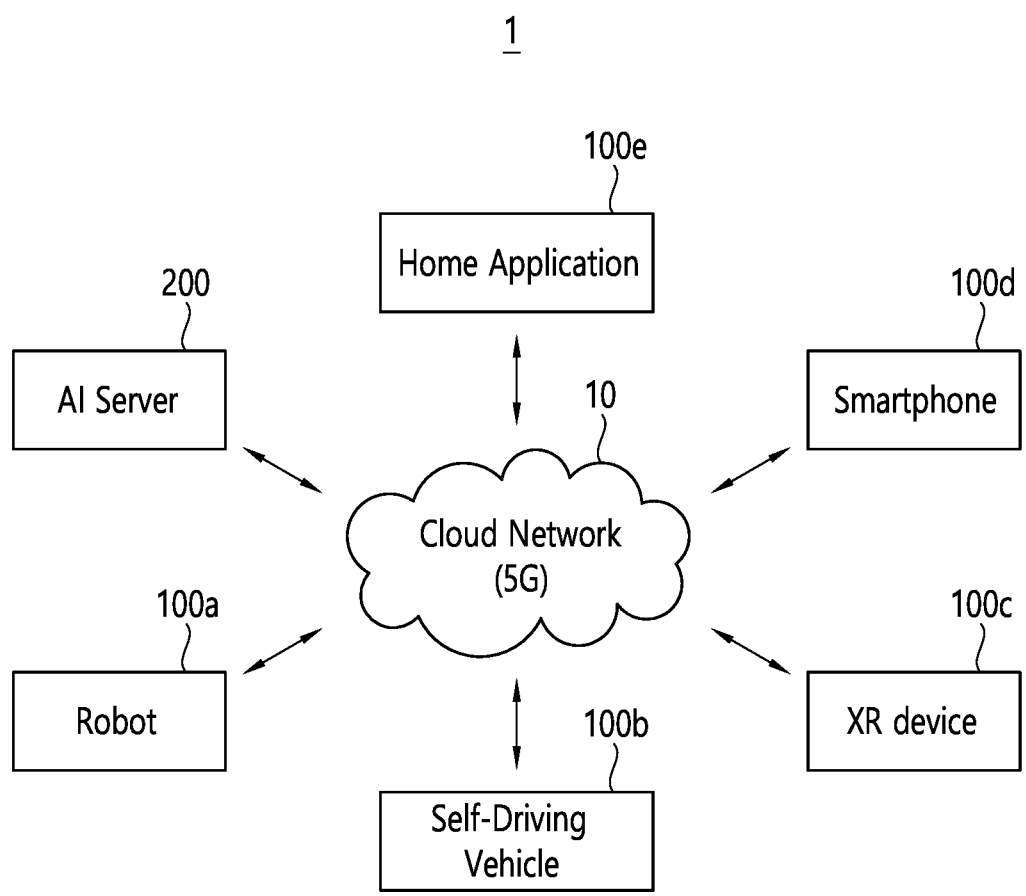
FIG. 26 shows an AI system 1 according to an embodiment.

FIG. 26 shows an AI system 1 according to an embodiment.

Referring to FIG. 26, an AI system 1 is connected to at least one of an AI server 200, a robot 100a, a self-driving vehicle 100b, an XR device 100c, a smartphone 100d, or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may be a network that constitutes a part of a cloud computing infrastructure or a network that exists in the cloud computing infrastructure. Here, the cloud network 10 may be configured using a 3G network, a 4G or LTE network, or a 5G network.

The devices 100a to 100e and 200 configuring the AI system 1 may be interconnected over the cloud network. Particularly, the devices 100a to 100e and 200 may communicate with each other through a base station but may directly communicate with each other without the intervention of a base station.

The AI server 200 may include a server that performs AI processing and a server that performs an operation on big data.

The AI server 200 is connected to at least one of the robot 100a, the self-driving vehicle 100b, the XR device 100c, the smartphone 100d or the home appliances 100e, that is, AI devices configuring the AI system, over the cloud network 10 and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model and may generate a response or control command based on the deduced result value.

Hereinafter, various embodiments of the AI devices 100a to 100e to which the aforementioned technology is applied will be described.

<AI+Robot>

The robot 100a, which adopts an AI technology, may be implemented as a guide robot, a transport robot, a cleaning robot, a wearable robot, an entertainment robot, a pet robot, an unmanned flying robot, and the like.

The robot 100a may include a robot control module for controlling an operation, and the robot control module may refer to a software module or a chip implemented with hardware.

The robot 100a may acquire status information of the robot 100a using sensor information acquired from various types of sensors, detect (recognize) surrounding environments and objects, generate map data, determine moving routes and driving plans, determine responses to user interactions, or determine actions.

Here, the robot 100a may use sensor information obtained from at least one sensor from among LIDAR, radar, and camera to determine a moving route and a driving plan.

The robot 100a may perform the above operations using a learning model including at least one artificial neural network. For example, the robot 100a may recognize a surrounding environment and an object using a learning model and may determine an operation using the recognized surrounding environment information or object information. Here, the learning model may be directly learned by the robot 100a or learned by an external device such as the AI server 200.

Here, the robot 100a may directly generate a result using a learning model and perform an operation, or transmit sensor information to an external device such as the AI server 200, receive a result generated accordingly, and perform an operation.

The robot 100a may determine a moving path and a driving plan using at least one of map data, object information detected from sensor information, or object information acquired from an external device, and control a driving unit to drive the robot 100a according to the moving path and the driving plan.

The map data may include object identification information on various objects arranged in a space in which the robot 100a moves. For example, the map data may include object identification information on fixed objects such as walls and doors and movable objects such as flower pots and desks. In addition, the object identification information may include a name, a type, a distance, and a location.

In addition, the robot 100a may perform an operation or run by controlling the driving unit based on the user's control/interaction. In this case, the robot 100a may acquire interaction intention information according to a user's motion or voice speech, determine a response based on the acquired intention information, and perform an operation.

<AI+Autonomous-Driving/Self-Driving>

The autonomous vehicle 100b may be implemented as a mobile robot, a vehicle, an unmanned aerial vehicle, etc., to which AI technology is applied.

The autonomous vehicle 100b may include an autonomous driving control module for controlling the autonomous driving function, and the autonomous driving control module may refer to a software module and/or a chip implementing the software module. The autonomous driving control module may be included in the autonomous vehicle 100b as a component of the autonomous vehicle 100b, but may be connected to the outside of the autonomous vehicle 100b with separate hardware.

The autonomous vehicle 100b may acquire the state information of the autonomous vehicle 100b using the sensor information acquired from various kinds of sensors and/or detect (recognize) the surrounding environment and/or the object, and/or generate map data, and/or determine a travel route and/or a travel plan, and/or determine an operation.

Like the robot 100a, the autonomous vehicle 100b can use the sensor information acquired from at least one sensor among the LIDAR, the radar, and/or the camera to determine the travel route and/or the travel plan.

In particular, the autonomous vehicle 100b can recognize an environment and/or an object for an area in which the field of view is obscured and/or over a certain distance by receiving sensor information from external devices, and/or receive the recognized information directly from external devices.

The autonomous vehicle 100b can perform the above-described operations using a learning model composed of at least one ANN. For example, the autonomous vehicle 100b can recognize the surrounding environment and/or the object using the learning model, and can determine the travel route using the recognized surrounding information and/or the object information. The learning model may be learned directly from the autonomous vehicle 100b and/or learned from an external device such as the AI server 200.

In this case, the autonomous vehicle 100b may perform an operation by generating a result using a direct learning model, but the autonomous vehicle may also perform operation by transmitting sensor information to an external device such as the AI server 200 and receiving the generated result.

The autonomous vehicle 100b may determine the travel route and/or the travel plan using at least one of the map data, the object information detected from the sensor information and/or the object information acquired from the external device, and drive the autonomous vehicle 100b according to the determined travel route and/or travel plan by controlling the driving unit.

The map data may include object identification information on various objects arranged in a space (e.g. road) in which the autonomous vehicle 100b moves. For example, the map data may include object identification information on fixed objects such as street lamps, rocks, and buildings, and/or on movable objects such as vehicles and pedestrians. The object identification information may include a name, a type, a distance, and/or a position, etc.

Also, the autonomous vehicle 100b may perform the operation and/or run by controlling the driving unit based on the control/interaction of the user. The autonomous vehicle 100b may acquire the intention information of the interaction due to the user's operation and/or voice utterance, determine the response based on the acquired intention information, and perform the operation.

<AI+XR>

The XR device 100c may be implemented as a HMD, a HUD, a TV, a mobile phone, a smartphone, a computer, a wearable device, a home appliance, a digital signage, a vehicle, a fixed robot, a mobile robot, etc., to which AI technology is applied.

The XR device 100c analyzes the three-dimensional point cloud data and/or image data acquired from various sensors and/or from an external device to generate position data and/or attribute data for the three-dimensional points, thereby obtaining information about the surrounding space and/or the real object, and outputting the rendered XR object. For example, the XR device 100c may output an XR object, which includes the additional information about the recognized object, by corresponding to the recognized object.

The XR device 100c can perform the above-described operations using a learning model composed of at least one ANN. For example, the XR device 100c can recognize a real object from three-dimensional point cloud data and/or image data using the learning model, and can provide information corresponding to the recognized real object. The learning model may be learned directly from the XR device 100c and/or learned from an external device such as the AI server 1200.

In this case, the XR device 100c may perform an operation by generating a result using a direct learning model, but the autonomous vehicle may also perform operation by transmitting sensor information to an external device such as the AI server 200 and receiving the generated result.

<AI+Robot+Autonomous-Driving/Self-Driving>

The robot 100a may be implemented as a guide robot, a carrying robot, a cleaning robot, a wearable robot, an entertainment robot, a pet robot, an unmanned flying robot, etc., to which AI technology and autonomous-driving technology are applied.

The robot 100a, to which the AI technology and the autonomous-driving technology are applied, may mean the robot 100a having the autonomous-driving function itself and/or the robot 100a interacting with the autonomous vehicle 100b.

The robot 100a having an autonomous-driving function can collectively refer to devices that move by themselves in accordance with a given travel route and/or move by determining the traveling route by themselves without user's control.

The robot 100a having the autonomous-driving function and the autonomous vehicle 100b can use a common sensing method to determine at least one of the travel route and/or the travel plan. For example, the robot 100a having the autonomous-driving function and the autonomous vehicle 100b can determine at least one of the travel route and/or the travel plan using the information sensed through the LIDAR, the radar, and/or the camera.

The robot 100a interacting with the autonomous vehicle 100b may exist separately from the autonomous vehicle 100b, and the robot 100a interacting with the autonomous vehicle 100b may be associated with the autonomous-driving function inside and/or outside the autonomous vehicle 100, and/or may perform an operation associated with the user aboard the autonomous vehicle 100b.

The robot 100a interacting with the autonomous vehicle 100b may acquire the sensor information on behalf of the autonomous vehicle 100b and provide it to the autonomous vehicle 100b, or the robot 100a interacting with the autonomous vehicle 100b may obtain the sensor information and generate the environment information and/or the object information to provide the autonomous vehicle 100b, thereby controlling and/or assisting the autonomous-driving function of the autonomous vehicle 100b.

Or, the robot 100a interacting with the autonomous vehicle 100b may monitor the user boarding the autonomous vehicle 100b and/or may control the functions of the autonomous vehicle 100b through interaction with the user. For example, when it is determined that the driver is in a drowsy state, the robot 100a may activate the autonomous-driving function of the autonomous vehicle 100b and/or assist the control of the driving unit of the autonomous vehicle 100b. The function of the autonomous vehicle 100b controlled by the robot 100a may include not only an autonomous-driving function but also a function provided by a navigation system and/or an audio system provided in the autonomous vehicle 100b.

Or, the robot 100a interacting with the autonomous vehicle 100b may provide information and/or assist the function to the autonomous vehicle 100b outside the autonomous vehicle 100b. For example, the robot 100a, such as a smart traffic light, may provide traffic information including signal information, etc., to the autonomous vehicle 100b. The robot 100a, such as an automatic electric charger of an electric vehicle, may interact with the autonomous vehicle 100b to connect the electric charger to the charging hole automatically.

<AI+Robot+XR>

The robot 100a may be implemented as a guide robot, a carrying robot, a cleaning robot, a wearable robot, an entertainment robot, a pet robot, an unmanned flying robot, a drone, etc., to which AI technology and XR technology are applied.

The robot 100a to which the XR technology is applied may refer to a robot that is subject to control/interaction in the XR image. In this case, the robot 100a may be separated from the XR device 100c and can be associated with each other.

When the robot 100a that is the subject to control/interaction in the XR image acquires the sensor information from the sensors including the camera, the robot 100a and/or the XR device 100c may generate an XR image based on the sensor information and the XR device 100c can output the generated XR image. The robot 100a can operate based on a control signal and/or a user's interaction input through the XR device 100c.

For example, the user can acknowledge the XR image corresponding to the viewpoint of the robot 100a remotely linked through the external device such as the XR device 100c, and can adjust the autonomous travel path of the robot 100a, control operation and/or driving, or check the information of neighboring objects, through interaction.

<AI+Autonomous-Driving/Self-Driving+XR>

The autonomous vehicle 100b may be implemented as a mobile robot, a vehicle, an unmanned aerial vehicle, etc., to which AI technology and XR technology are applied.

The autonomous driving vehicle 100b to which the XR technology is applied may mean an autonomous vehicle having means for providing an XR image and/or an autonomous vehicle that is subject to control/interaction in the XR image. Particularly, the autonomous vehicle 100b that is subject to control/interaction in the XR image may be separated from the XR device 100c and can be associated with each other.

The autonomous vehicle 100b having the means for providing the XR image can acquire the sensor information from the sensors including the camera and output the generated XR image based on the acquired sensor information. For example, the autonomous vehicle 100b may include an HUD to output an XR image, thereby providing a passenger with a real object and/or an XR object corresponding to an object in the screen.

At this time, when the XR object is output to the HUD, at least a part of the XR object may be output so as to overlap with the actual object that the passenger's gaze is directed to. On the other hand, when the XR object is output to the display provided in the autonomous vehicle 100b, at least a part of the XR object may be output so as to overlap with the object in the screen. For example, the autonomous vehicle 100*b* can output XR objects corresponding to objects such as a lane, another vehicle, a traffic light, a traffic sign, a two-wheeled vehicle, a pedestrian, a building, etc.

When the autonomous vehicle 100*b* that is the subject to control/interaction in the XR image acquires the sensor information from the sensors including the camera, the autonomous vehicle 100*b* and/or the XR device 100*c* may generate an XR image based on the sensor information and the XR device 100*c* can output the generated XR image. The autonomous vehicle 100*b* can operate based on a control signal and/or a user's interaction input through the XR device 100*c*.

In the above, preferred embodiments have been exemplarily described, but the disclosure of the present specification is not limited to such specific embodiments, and thus, it may be modified, changed, or improved in various forms within the scope set forth in the claims.

What is claimed is:

1. A method performed by a User Equipment (UE) subscribed to a third Public Land Mobile Network (PLMN), the method comprising:
   receiving services from the third PLMN;
   moving to a first PLMN which can provide roaming services to the UE and has a roaming agreement with the third PLMN;
   transmitting a registration request message to a network node of a second PLMN which can provide disaster roaming services to the UE based on a disaster occurring in the first PLMN; and
   receiving a registration accept message from the network node of the second PLMN in response to the registration request message;
   wherein the registration accept message includes information informing the UE that the UE has registered with the second PLMN and information about the disaster occurring in the first PLMN, and
   wherein the second PLMN provides only limited services.

2. The method of claim 1, wherein the method further comprises:
   displaying at least one of the information informing the UE that the UE has registered with the second PLMN or the information about the disaster occurring in the first PLMN on a screen of the UE.

3. The method of claim 2, wherein the information informing the UE that the UE has registered with the second PLMN is displayed by a signal strength from a base station of the second PLMN.

4. The method of claim 2, wherein the information about the disaster occurring in the first PLMN is displayed by a signal strength from a base station of the first PLMN being lowest.

5. The method of claim 2, wherein the information informing the UE that the UE has registered with the second PLMN or the information about the disaster occurring in the first PLMN is displayed by a message indicating that the first PLMN is not serviceable so the UE has registered with the second PLMN.

6. The method of claim 5, wherein the message includes a list of the limited services provided by the second PLMN.

7. The method of claim 2, wherein an icon of an application that requires a service not provided by the second PLMN is displayed differently from an icon of an application that only requires one or more limited services provided by the second PLMN.

8. The method of claim 2, wherein an icon of an application that requires a service not provided by the second PLMN is displayed in shade, black and white, or transparently.

9. The method of claim 2, wherein only icons of applications that require only one or more limited services provided by the second PLMN are displayed.

10. The method of claim 9, wherein the limited services provided by the second PLMN include at least one of a call service, a message service, and a limited data service.

11. A User Equipment (UE) subscribed to a third Public Land Mobile Network (PLMN), the UE comprising:
    a transceiver;
    a processor; and
    a memory operably connectable to the processor and storing instructions that, based on being executed by the processor, perform operations comprising:
    receiving services from the third PLMN;
    moving to a first PLMN which can provide roaming services to the UE and has a roaming agreement with the third PLMN;
    transmitting a registration request message to a network node of a second PLMN which can provide disaster roaming services to the UE based on a disaster occurring in the first PLMN; and
    receiving a registration accept message from the network node of the second PLMN in response to the registration request message;
    wherein the registration accept message includes information informing the UE that the UE has registered with the second PLMN and information about the disaster occurring in the first PLMN, and
    wherein the second PLMN provides only a limited service.

12. The UE of claim 11, wherein the operations further comprise:
    displaying at least one of the information informing the UE that the UE has registered with the second PLMN or the information about the disaster occurring in the first PLMN on a screen of the UE.

13. The UE of claim 12, wherein the information informing the UE that the UE has registered with the second PLMN is displayed by a signal strength from a base station of the second PLMN.

14. The UE of claim 12, wherein the information about the disaster occurring in the first PLMN is displayed by a signal strength from a base station of the first PLMN being lowest.

15. The UE of claim 12, wherein the information informing the UE that the UE has registered with the second PLMN or the information about the disaster occurring in the first PLMN is displayed by a message indicating that the first PLMN is not serviceable so the UE has registered with the second PLMN.

16. The UE of claim 15, wherein the message includes a list of the limited services provided by the second PLMN.

17. The UE of claim 12, wherein an icon of an application that requires a service not provided by the second PLMN is displayed differently from an icon of an application that only requires one or more limited services provided by the second PLMN.

18. The UE of claim 12, wherein an icon of an application that requires a service not provided by the second PLMN is displayed in shade, black and white, or transparently.

19. The UE of claim 12, wherein only icons of applications that require only one or more limited services provided by the second PLMN are displayed.

20. The UE of claim 19, wherein the limited services provided by the second PLMN includes at least one of a call service, a message service, and a limited data service.

* * * * *